United States Patent
Ravichandran et al.

(10) Patent No.: US 12,355,779 B2
(45) Date of Patent: Jul. 8, 2025

(54) METHODS AND PROCEDURES TO PROTECT NETWORK NODES IN CLOUD-BASED TELECOMMUNICATION AND ENTERPRISE NETWORKS

(71) Applicant: RAKUTEN MOBILE, INC., Tokyo (JP)

(72) Inventors: Bharath Kumar Ravichandran, Tokyo (JP); John Carse, Tokyo (JP); Pradheepkumar Singaravelu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/010,355

(22) PCT Filed: Sep. 30, 2022

(86) PCT No.: PCT/US2022/045308
§ 371 (c)(1),
(2) Date: Dec. 14, 2022

(87) PCT Pub. No.: WO2023/214988
PCT Pub. Date: Nov. 9, 2023

(65) Prior Publication Data
US 2024/0106833 A1    Mar. 28, 2024

Related U.S. Application Data

(60) Provisional application No. 63/339,108, filed on May 6, 2022, provisional application No. 63/338,532, filed (Continued)

(51) Int. Cl.
*H04L 9/40* (2022.01)

(52) U.S. Cl.
CPC .............. *H04L 63/108* (2013.01); *H04L 9/40* (2022.05); *H04L 63/08* (2013.01);
(Continued)

(58) Field of Classification Search
None
See application file for complete search history.

(56) References Cited

U.S. PATENT DOCUMENTS

| 9,626,667 B2 * | 4/2017 | Boccon-Gibod ....... H04L 63/10 |
| 2007/0100768 A1 * | 5/2007 | Boccon-Gibod .... G06Q 20/202 705/59 |

(Continued)

OTHER PUBLICATIONS

Written Opinion of the International Searching Authority dated Feb. 23, 2023 in Application No. PCT/US2022/045308.
(Continued)

*Primary Examiner* — Samson B Lemma
(74) *Attorney, Agent, or Firm* — Sughrue Mion, PLLC

(57) ABSTRACT

Provided are a method, system, and computer-readable recording medium for controlling zero trust remote access to a network system. The method includes: receiving a request of a user to access a target node in the network system; determining whether the user is a trusted user or an untrusted user based on whether the user has a subscription identification (ID) registered and valid in the network system; based on determining that the user is the untrusted user, generating the subscription ID for the user; validating a trust of the user; determining a validity period for the subscription ID of the user based on the validated trust; and providing the user with access to the target node in accordance with the validity period.

17 Claims, 30 Drawing Sheets

Related U.S. Application Data on May 5, 2022, provisional application No. 63/338,570, filed on May 5, 2022.

(52) U.S. Cl.
CPC ........ *H04L 63/0892* (2013.01); *H04L 63/101* (2013.01); *H04L 63/102* (2013.01); *H04L 63/1433* (2013.01)

(56) References Cited

U.S. PATENT DOCUMENTS

| | | | |
|---|---|---|---|
| 2007/0172041 A1* | 7/2007 | Boccon-Gibod | G06Q 20/202 379/142.1 |
| 2008/0028453 A1* | 1/2008 | Nguyen | H04L 63/0815 726/10 |
| 2009/0086977 A1* | 4/2009 | Berggren | H04L 9/3263 380/279 |
| 2012/0151568 A1* | 6/2012 | Pieczul | H04L 63/0815 726/8 |
| 2012/0278869 A1* | 11/2012 | Guccione | H04L 67/55 726/5 |
| 2021/0266743 A1* | 8/2021 | Kvochko | H04L 63/102 |
| 2021/0336959 A1* | 10/2021 | Shah | H04L 63/0281 |
| 2022/0210173 A1* | 6/2022 | Katmor | H04L 63/1416 |
| 2022/0279023 A1* | 9/2022 | Solari | H04W 12/069 |
| 2023/0269690 A1* | 8/2023 | Ramezan | H04L 9/3271 455/435.1 |
| 2023/0300150 A1* | 9/2023 | O'Neill | H04L 63/102 726/22 |

OTHER PUBLICATIONS

International Search Report dated Feb. 23, 2023 in Application No. PCT/US2022/045308.

* cited by examiner

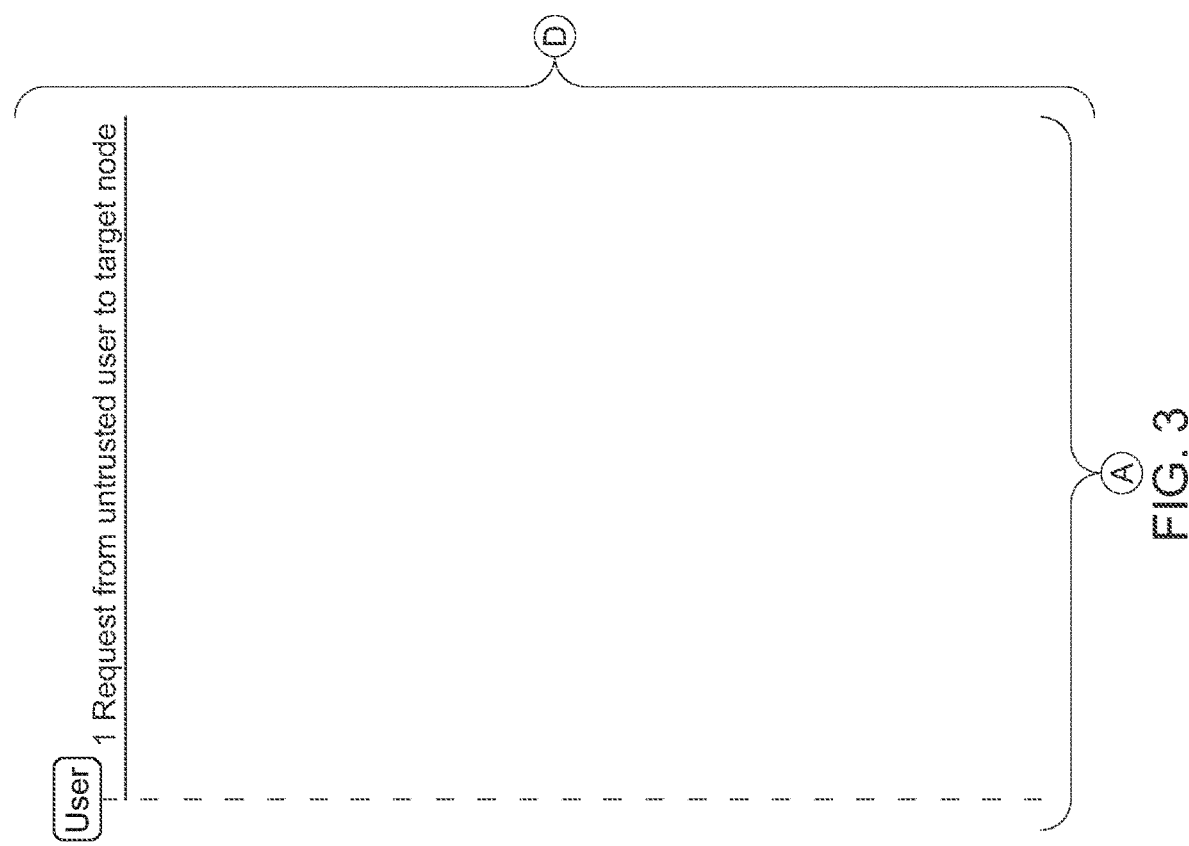

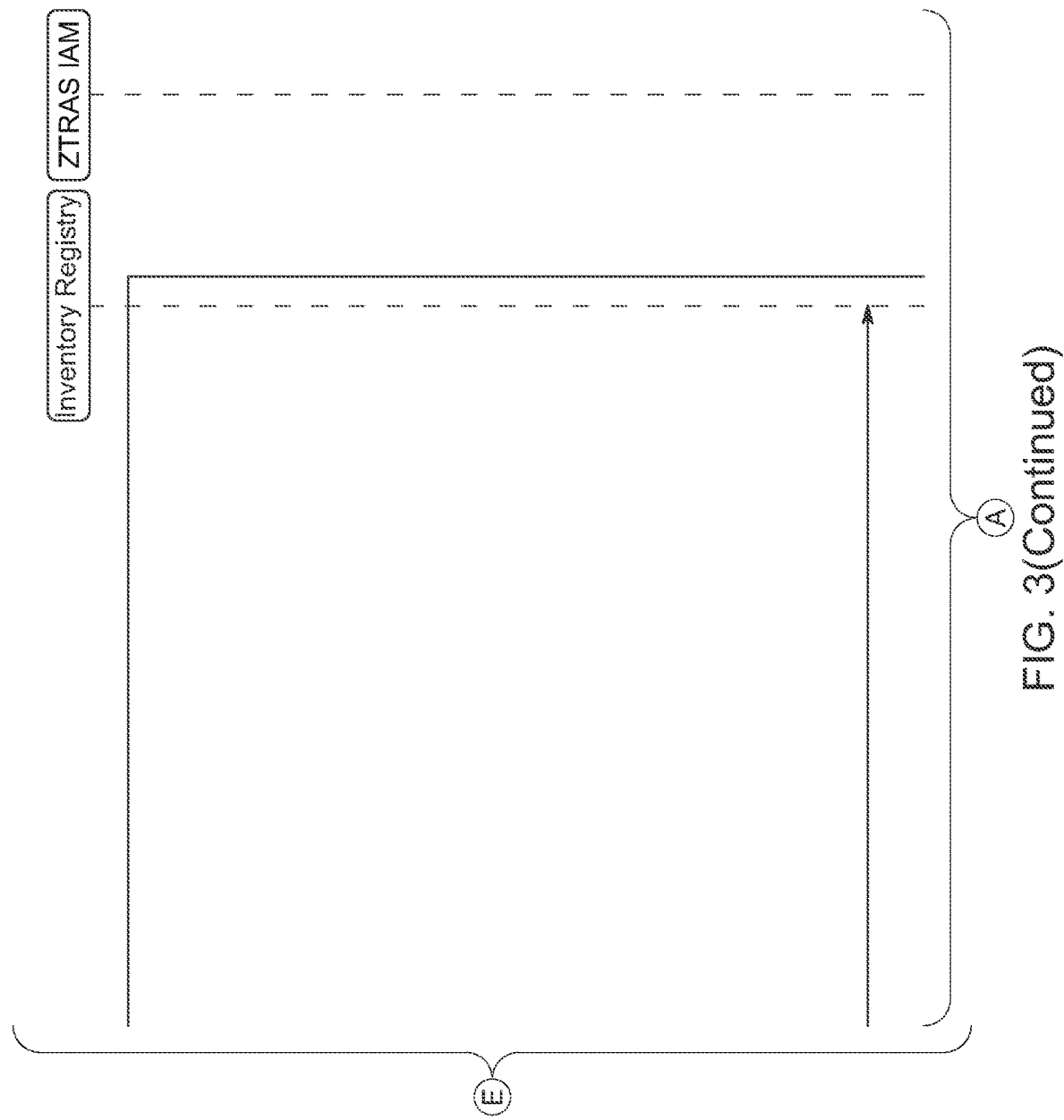

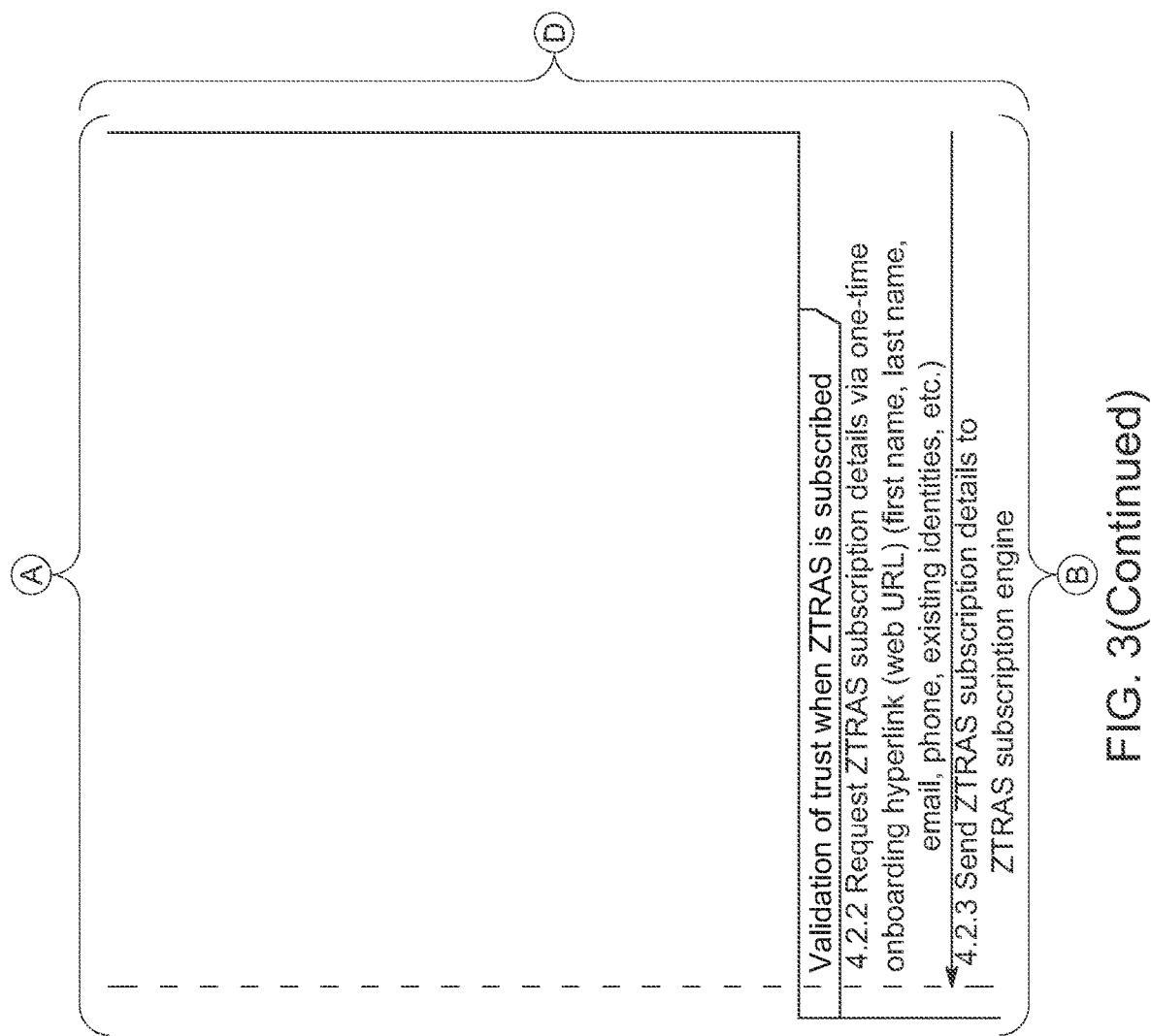

METHODS AND PROCEDURES TO PROTECT NETWORK NODES IN CLOUD-BASED TELECOMMUNICATION AND ENTERPRISE NETWORKS

CROSS REFERENCE TO RELATED APPLICATIONS

This application is a National Stage of International Application No. PCT/US2022/045308 filed Sep. 30, 2022, claiming priority based on U.S. Provisional Patent Application No. 63/338,570 filed May 5, 2022, U.S. Provisional Patent Application No. 63/338,532 filed May 5, 2022 and U.S. Provisional Patent Application No. 63/339,108 filed May 6, 2022, the disclosures of which are incorporated herein by reference in their entireties.

BACKGROUND

1. Field

Apparatuses and methods consistent with example embodiments of the present disclosure relate to a security system and method for a cloud-based telco network system, and more particularly to methods and procedures for protecting network nodes in said network system.

2. Description of Related Art

Recently, telecommunication network systems have been undergoing a transformation from a hardware-based system to a virtualized, software-based system or cloud system. Although security for cloud systems may have been undergoing development in the past decade, the security aspect for cloud-based telco network systems remains a relatively new area for exploring and enhancement.

Generally, a network system allows a node to connect to another node (e.g., a target node). In related art cloud security systems and procedures, there is no way to determine or classify the user who is sending a request (e.g., access request) to the network. Lacking a way to determine/classify the destination/type of the user causes security issues and risks in cloud-based telco network systems, such as (but not limited to) the following: (a) difficulties in micro segmentation of control plane and data plane traffic data at rest; (b) security attacks due to behavior profiling; and (c) stolen credentials and/or insider threat.

SUMMARY

According to embodiments, systems and methods are provided for including a zero trust-remote access system (ZTRAS) to control access to a target node by validating a user request based on a classification of the requesting user. As a result, an additional layer of security is provided to prevent abuse by any intruders or any malicious application.

According to example embodiments, a method for providing zero trust remote access to a node in a network system, includes: receiving a request of a user to access a target node in the network system; determining whether the user is a trusted user or an untrusted user based on whether the user has a subscription identification (ID) registered and valid in the network system; based on determining that the user is the untrusted user, generating the subscription ID for the user; validating a trust of the user; determining a validity period for the subscription ID of the user based on the validated trust; and providing the user with access to the target node in accordance with the validity period.

According to example embodiments, a system for providing zero trust remote access to a node in a network system, includes: at least one memory storing instructions; and at least one processor configured to execute the instructions to: receive a request of a user to access a target node in the network system, determine whether the user is a trusted user or an untrusted user based on whether the user has a subscription identification (ID) registered and valid in the network system, based on determining that the user is the untrusted user, generate the subscription ID for the user, validate a trust of the user, determine a validity period for the subscription ID of the user based on the validated trust, and provide the user with access to the target node in accordance with the validity period.

According to example embodiments, a non-transitory computer-readable recording medium has recorded thereon instructions executable by at least one processor to perform a method for providing zero trust remote access to a node in a network system, the method including: receiving a request of a user to access a target node in the network system; determining whether the user is a trusted user or an untrusted user based on whether the user has a subscription identification (ID) registered and valid in the network system; based on determining that the user is the untrusted user, generating the subscription ID for the user; validating a trust of the user; determining a validity period for the subscription ID of the user based on the validated trust; and providing the user with access to the target node in accordance with the validity period.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
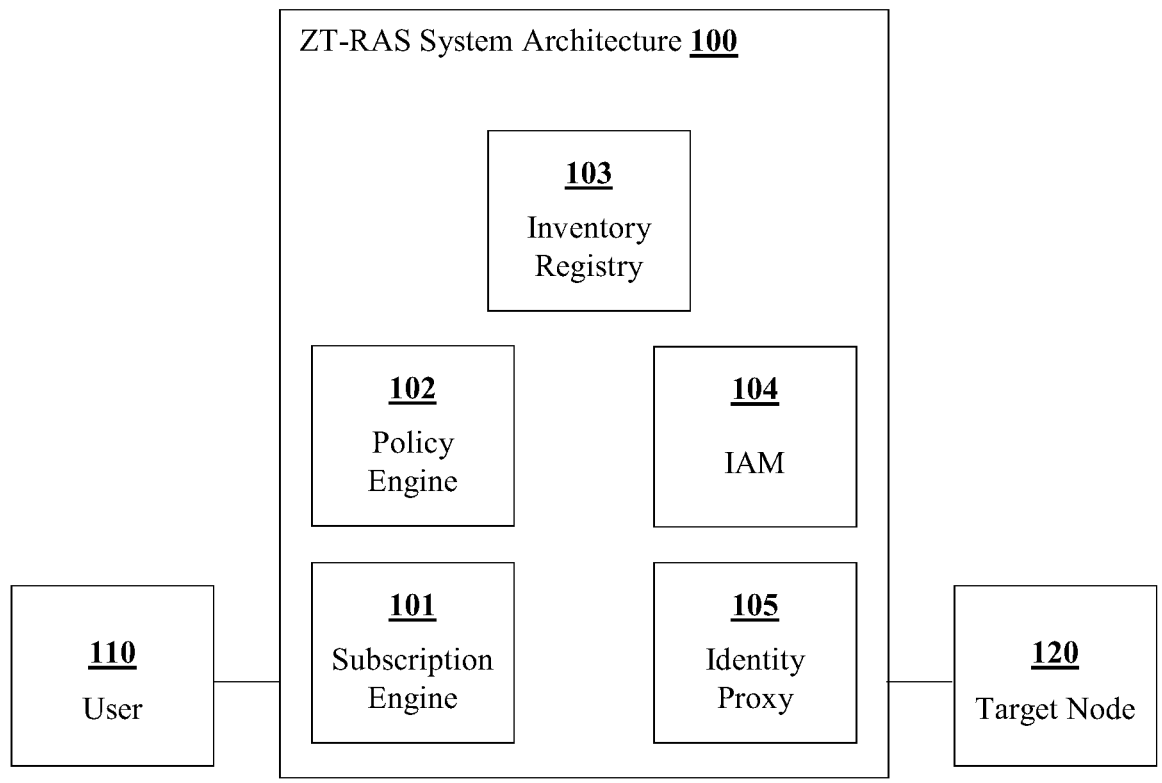
FIG. 1 illustrates a system architecture of a zero trust-remote access system (ZTRAS) for providing network access from a user to a target node in a network, in accordance with an example embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed herein, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, example embodiments of the present invention provide systems and methods for including a zero trust-remote access system (ZTRAS) to control user access to a target node in a network. Specifically, the ZTRAS validates whether a user request for accessing a target node is legitimate, and/or classifies the user into one of plural different types (e.g., internal trusted user, external trusted user, or untrusted user).

The ZTRAS according to example embodiments is a centralized boundary-less identity and access management system based on authentication request attributes, context, identity, and network policies that validate any type of adversary connection request as legitimate or illegitimate from any untrusted or trusted network (or network node). The solution provides an additional layer of security to prevent abuse by any intruders or any malicious application.

The ZTRAS according to example embodiments ensures that adversary requests are verified based on trust validation and a trust percentage value before allowing authenticated access to the application nodes, terminal nodes, or radio nodes in the network. The ZTRAS according to example embodiments provides centralized user subscription identity as a single identity for any user subscriber to authenticate and access any nodes in the cloud-based telecommunication and enterprise networks.

The ZTRAS subscription engine (which may include a processing engine and any other suitable elements) according to example embodiments validates whether a user request for accessing a target node is legitimate or not, and/or classifies the user as an untrusted user, an external trusted user, or an internal trusted user. The user classification may be performed by the ZTRAS based on a unique ID generated by the ZTRAS subscription engine along with the trust percentage of the user in a novel way. Accordingly, example embodiments provide a novel approach and process for classifying the user sending a request.

By determining the type of user initiating the request, managing the context of the user by means of a unique subscription identifier and limiting the scope of the user (e.g., user access) based on the trust validation, systems and methods according to one or more embodiments achieve one or more of the following benefits: (1) simplify micro segmentation of control plane and data plane traffic data at rest; (2) provide node access taking into consideration node history (e.g., past access sessions, node location, etc.), which in turn effectively prevents security attacks due to behavior profiling; (3) provide a simple login process with improved user experience, since users can onboard their existing account to obtain a unique ID, and the unique ID will be usable for accessing all nodes in the network system; (4) minimize the risk of credential stealing and the resulting insider threats by means of impersonation, as the user subscription is uniquely determined with the trust validation for every request.

In accordance with one or more example embodiments, inventory registry is mandatory for all trusted nodes in or accessing the system. A node (or target node) as described herein may be classified as an application, a cloud-native network function (CNF), a virtualized network function (VNF), a cluster, a host, a physical node, an endpoint, or any potential element in the network system.

As used herein, a $ZTRAS_{id}$ (ZTRAS ID or telco operator ZTRAS ID) is a unique identifier provisioned for users of, or attempting access to, the network system, such as employee/operator/contractor/sales/marketspace/customer based on existing user identities.

An inventory registry in one or more example embodiments shall have all mandatory information of at least internal trusted nodes and external trusted nodes, respectively. For internal trusted nodes (e.g., nodes such as those provided or authorized by the network operator), at least one of the following information may be mandatory (though the information in the registry is not limited thereto): Internet protocol address (IP), Hostname, fully qualified domain name (FQDN), application name, namespace, cluster ID, endpoints, Media Access Control (MAC) address, location, universally unique identifier (UUID), serial number, equipment type, identity management integrated, secrets management integrated, centralized logging integrated, internal certificate details, etc. This information may be provided during registration of ZTRAS subscription for the trusted nodes.

For external trusted nodes (e.g., nodes such as those provided by vendors or service providers to the telco network system), at least one of the following information may be mandatory for the inventory registry (though the information in the registry is not limited thereto): IP, FQDN, endpoints, location, UUID, serial number, equipment type, public certificate details.

ZTRAS identity and access management (IAM) according to one or more example embodiments is a centralized IAM solution that supports authentication protocols such as, but not limited to, Lightweight Directory Access Protocol (LDAP), Remote Authentication Dial-In User Service (RADIUS), Terminal Access Controller Access-Control System (TACACS), OpenID Connect (OIDC), Open Authorization 2 (OAUTH2), etc.

A ZTRAS subscription engine according to one or more example embodiments is a central node coupling to a plurality of nodes (e.g., any node) in the system. In accordance with an embodiment, when an entity (e.g., a user, a node, etc.) wants to access a network node in the system, the entity will first arrive at the ZTRAS subscription engine. The ZTRAS subscription engine will validate whether the entity is legitimate or not.

A ZTRAS artificial intelligence (AI) Policy Engine according to one or more example embodiments is a centralized policy engine that leverages machine learning algorithms to perform trust validation and trust percentage calculation for incoming requests from untrusted and trusted users. In one or more other embodiments, a policy engine that does not utilize machine learning algorithms (e.g., a policy engine that utilizes one or more predefined rules) may be utilized.

FIG. 1 illustrates a system architecture 100 of a zero trust-remote access system (ZTRAS) for providing network access from a user (i.e., user node) 110 to a target node 120 in a network (e.g., a telecommunications network), in accordance with an example embodiment.

Referring to FIG. 1, the system architecture 100 includes a ZTRAS subscription engine 101, a ZTRAS AI policy engine 102, an inventory registry 103, a ZTRAS IAM 104, and a ZTRAS identity proxy 105.

The ZTRAS subscription engine 101 is configured to receive a user request to access a target node 120, and facilitate access (e.g., reject or provide) to the target node 120. The user request may be received from an internal or external user 110 (i.e., user device or user/source node), and may be received from a trusted or untrusted user 110. Further, the trusted user (e.g., internal trusted user or external trusted user) may be a user that has a previously-registered ZTRAS subscription in the system (e.g., has a previously-generated/registered $ZTRAS_{id}$ that is valid). The ZTRAS subscription engine 101 may determine whether the user is a trusted user or an untrusted user, and whether the user is internal or external, and provide access accordingly.

The ZTRAS AI policy engine 102 is configured to perform trust validation and trust percentage calculation for incoming requests from untrusted and trusted users. Here, the ZTRAS AI policy engine 102 may implement algorithms to determine whether the user is trusted or untrusted, to determine whether the user is external or internal, and to calculate a trust percentage for the user.

The inventory registry 103 is configured to store user information as described above, that is used to manage ZTRAS subscriptions of users and determine validity of user requests, session data, etc.

The ZTRAS IAM 104 is configured to generate a $ZTRAS_{id}$ and authenticate a user that is requesting access to the network.

The ZTRAS identity proxy 105 is configured to receive a request to access a target node from an authenticated trusted user (external or internal), and to provide the request to the target node 120 upon validation (e.g., validation of an access token included with the request).

Figure 2:
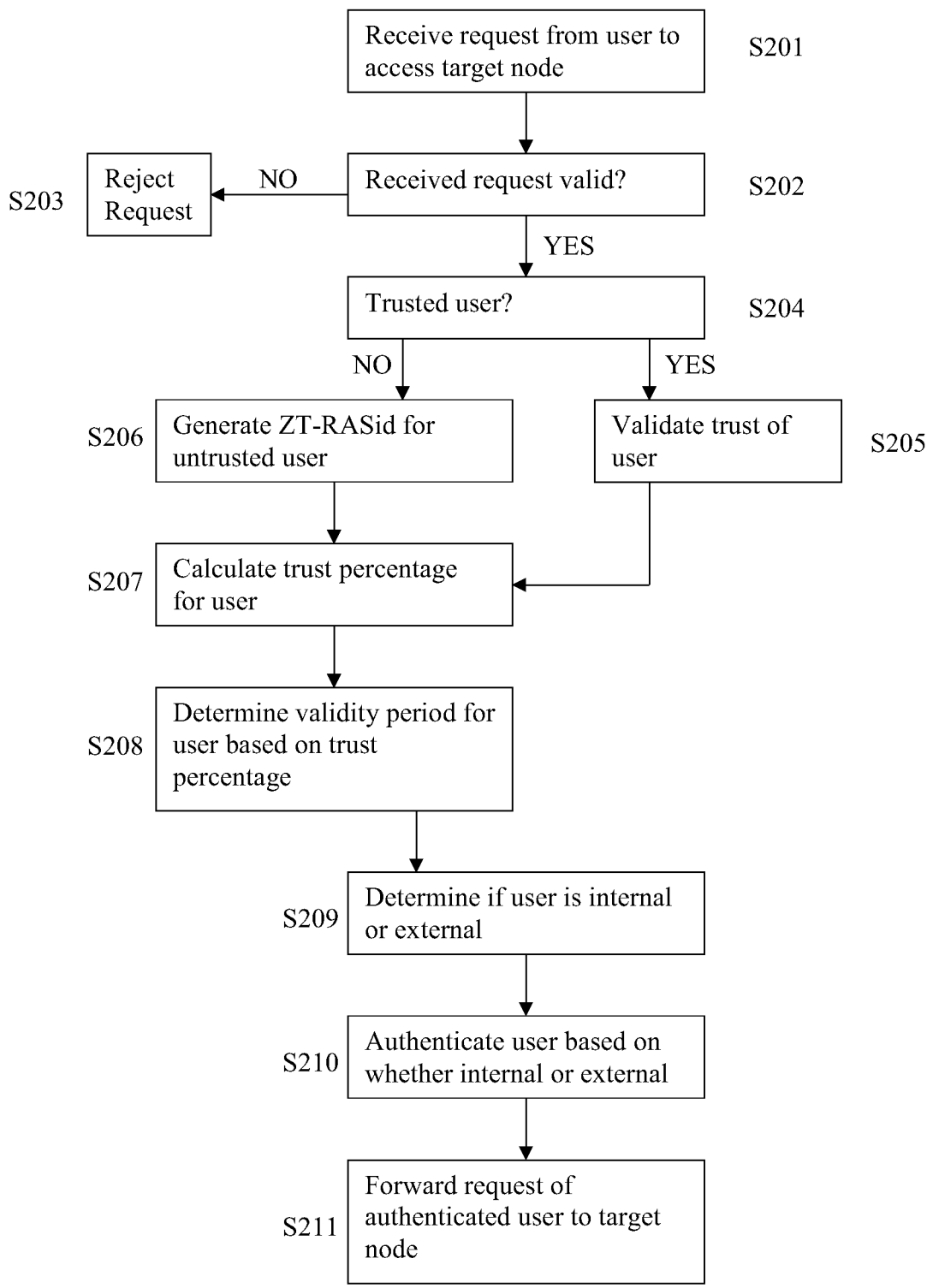
FIG. 2 illustrates a method of providing zero trust access to a target node in a network, in accordance with an example embodiment.

FIG. 2 illustrates a method of providing zero trust access to a target node in a network, in accordance with an example embodiment. The method of FIG. 2 may be performed by at least one processor (e.g., embodied or embodying the components of the system architecture described with reference to FIG. 1) executing instructions stored in memory.

Referring to FIG. 2, at operation S201, a request to access a target node is received from a user. Here, the request may be received by the ZTRAS subscription engine 101 from an internal trusted user, an external trusted user, or an untrusted user. Further, the trusted user (e.g., internal trusted user or external trusted user) may be a user that has a previously-registered ZTRAS subscription in the system (i.e., has a previously-generated/registered $ZTRAS_{id}$ that is valid).

At operation S202, the request is validated. For example, the ZTRAS subscription engine 101 may provide one or more parameters or attributes of the request to the ZTRAS AI Policy Engine 102, which then validates if the request is legitimate or not. The validation may be with respect to a type of raw data included in the request.

If the request is determined to be invalid, the request is rejected or dropped at operation S203 and the process ends. Otherwise, the process proceeds to operation S204.

At operation S204, it is determined whether the user is a trusted user or an untrusted user. For example, the user may be determined to be an untrusted user when the user does not have a $ZTRAS_{id}$ subscribed (e.g., no $ZTRAS_{id}$ is appended or included in the request, the included $ZTRAS_{id}$ is not registered in the inventory, etc.) or a validity period of the $ZTRAS_{id}$ has expired. Here, the ZTRAS subscription engine 101 and/or the ZTRAS AI Policy Engine 102 may determine if a ZTRAS subscription is subscribed or registered for the user (e.g., by communication with the inventory registry).

If the user is determined to be a trusted user (Yes at S204), the trust of the user is validated. In this regard, the trust is validated for every incoming request, even if from a trusted user for which context has not changed. In this case, for a trusted user, a trust percentage and corresponding validity period are calculated and/or validated irrespective of whether the context has changed. According to another embodiment, it may be determined whether a new trust percentage is to be calculated and a corresponding validity period is to be set for the user based on whether a context (e.g., user context or request context) is determined (e.g., by the ZTRAS subscription engine 101 and/or the ZTRAS AI Policy Engine 102) to be changed. In this alternate embodiment, if the context for the trusted user has not changed, then no new trust percentage and validity period is determined and process proceeds to operation S209.

Meanwhile, if the user is determined to be an untrusted user (No at S204), then a $ZTRAS_{id}$ is generated for the user, registered in the inventory registry 103, and provided to the user at operation S206. A method of generating a $ZTRAS_{id}$ according to an example embodiment is described below with reference to FIG. 6.

At operation S207, a trust percentage is determined (e.g., calculated) for the user based on one or more request parameters (e.g., a geolocation, IP address, IP version, FQDN, device credentials, etc.). Further, the trust percentage may be calculated differently based on whether the user is an internal user or external user (e.g., with a lower trust percentage for external user). The trust percentage may be determined by the ZTRAS AI Policy Engine 102.

At operation S208, a validity period is determined for the user based on the trust percentage. The validity period may be determined by the ZTRAS subscription engine 101 based on a predetermined mapping between validity periods and trust percentages. Further, the validity period may differ based on whether the user is external or internal (e.g., with a lower maximum validity period for an external user).

At operation S209, it is determined whether the user is an internal user or an external user (e.g., third party contractor or vendor). For example, the ZTRAS AI Policy Engine 102 may make this determination based on at least one of certificate details (e.g., internal certificate or external/public certificate), email domain, FQDN, IP address, etc.

At operation S210, the user is authenticated (e.g., by the ZTRAS IAM 104) based on whether the user is the internal user or the external user.

At operation S211, the request of the authenticated user is forwarded or provided to the target node 120. For example, the request may be forwarded from the ZTRAS subscription engine 101 to the ZTRAS identity proxy 105 with an access token that is validated by the identity proxy 105. Upon successful validation, the identity proxy 105 may then forward the request to the target node 120.

Hereinbelow, example methods (or ZTRAS use cases) of logging in users (untrusted, internal trusted, and external trusted) and managing ZTRAS subscriptions of users according to some example embodiments are described.

Use Case 1: Untrusted User (ZTRAS Subscriber) Login

Figure 3:
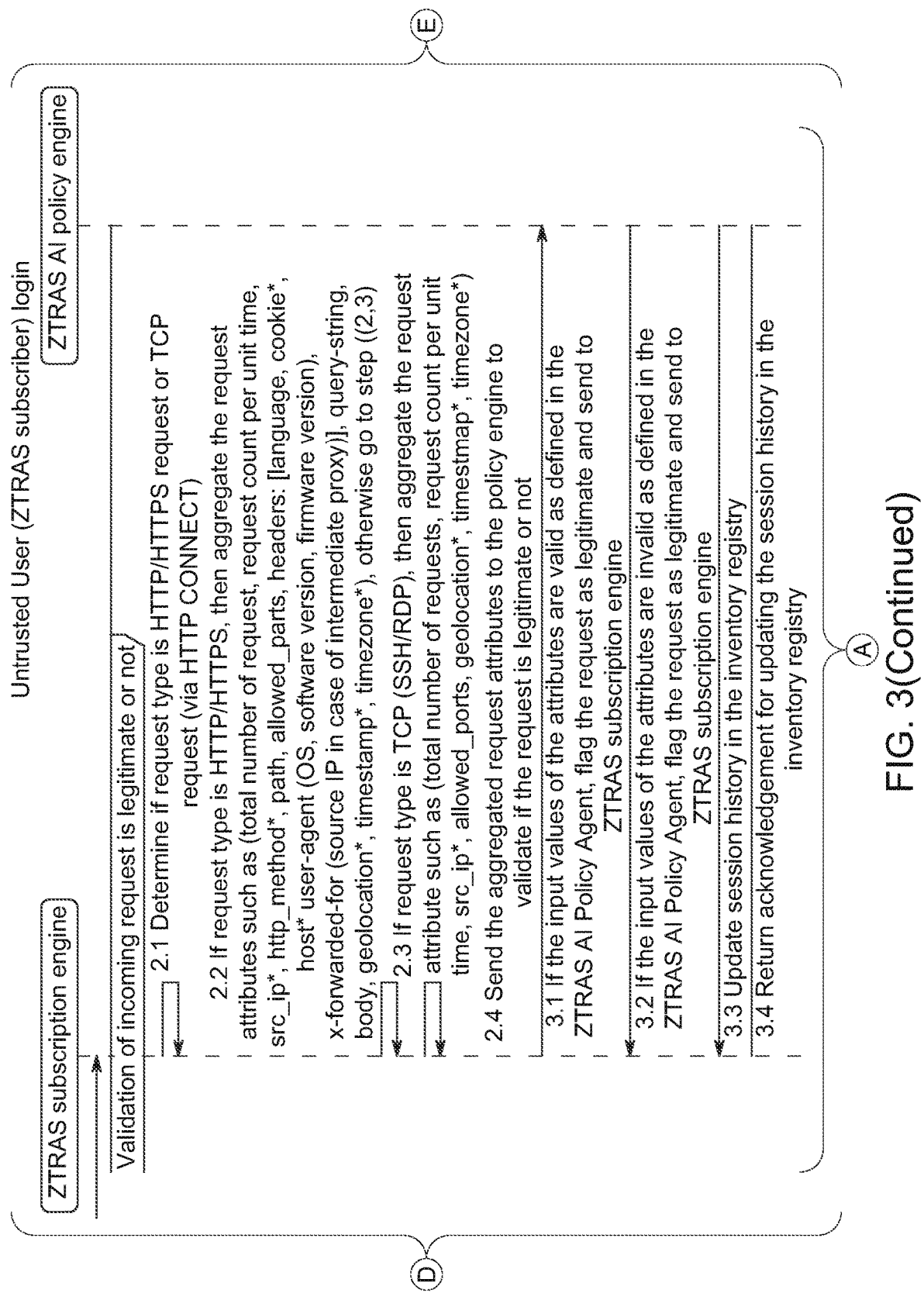
FIG. 3 illustrates a login call flow for an untrusted user (ZTRAS subscriber) login according to an embodiment.
Figure 3:
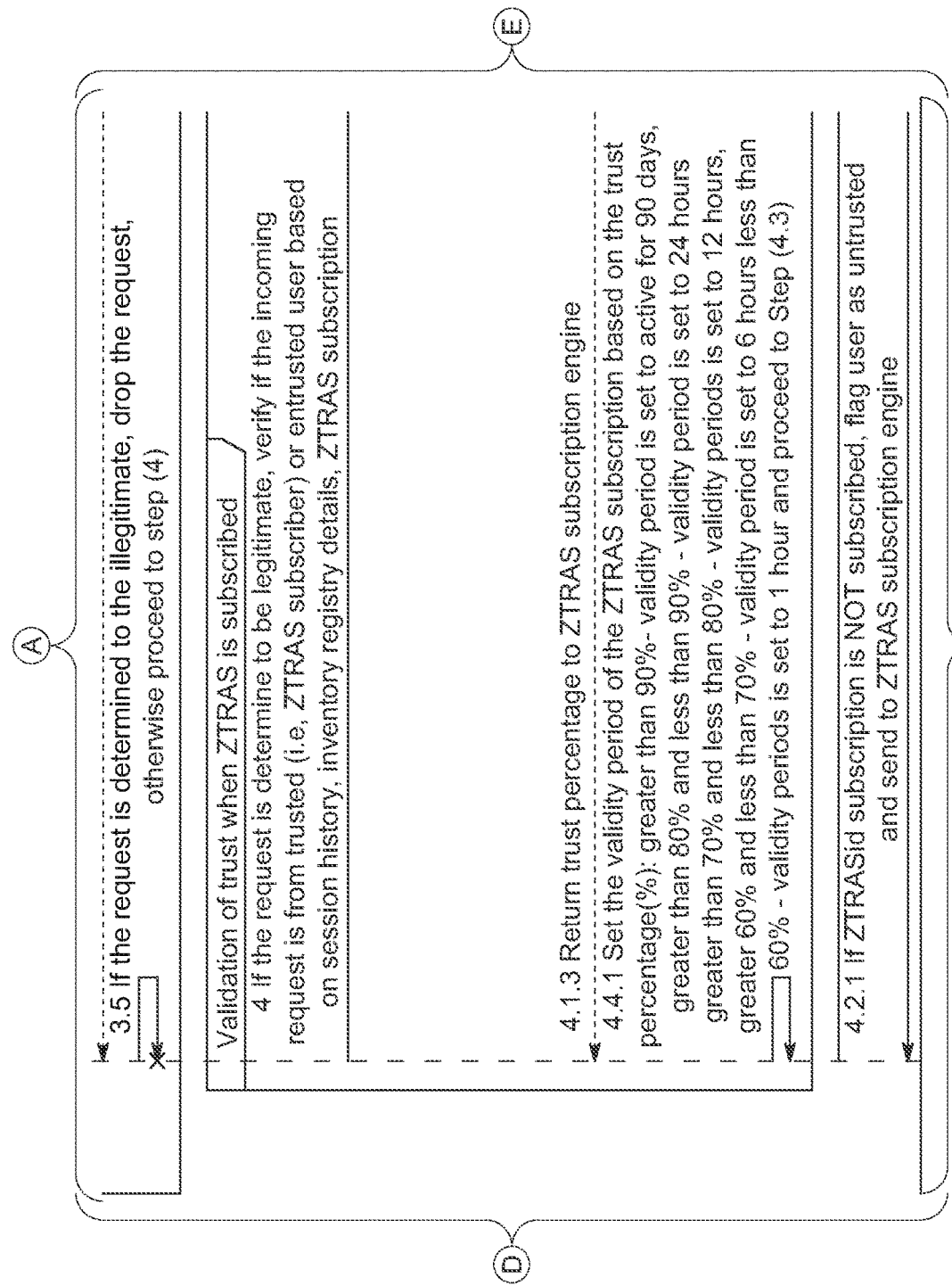
Figure 3:
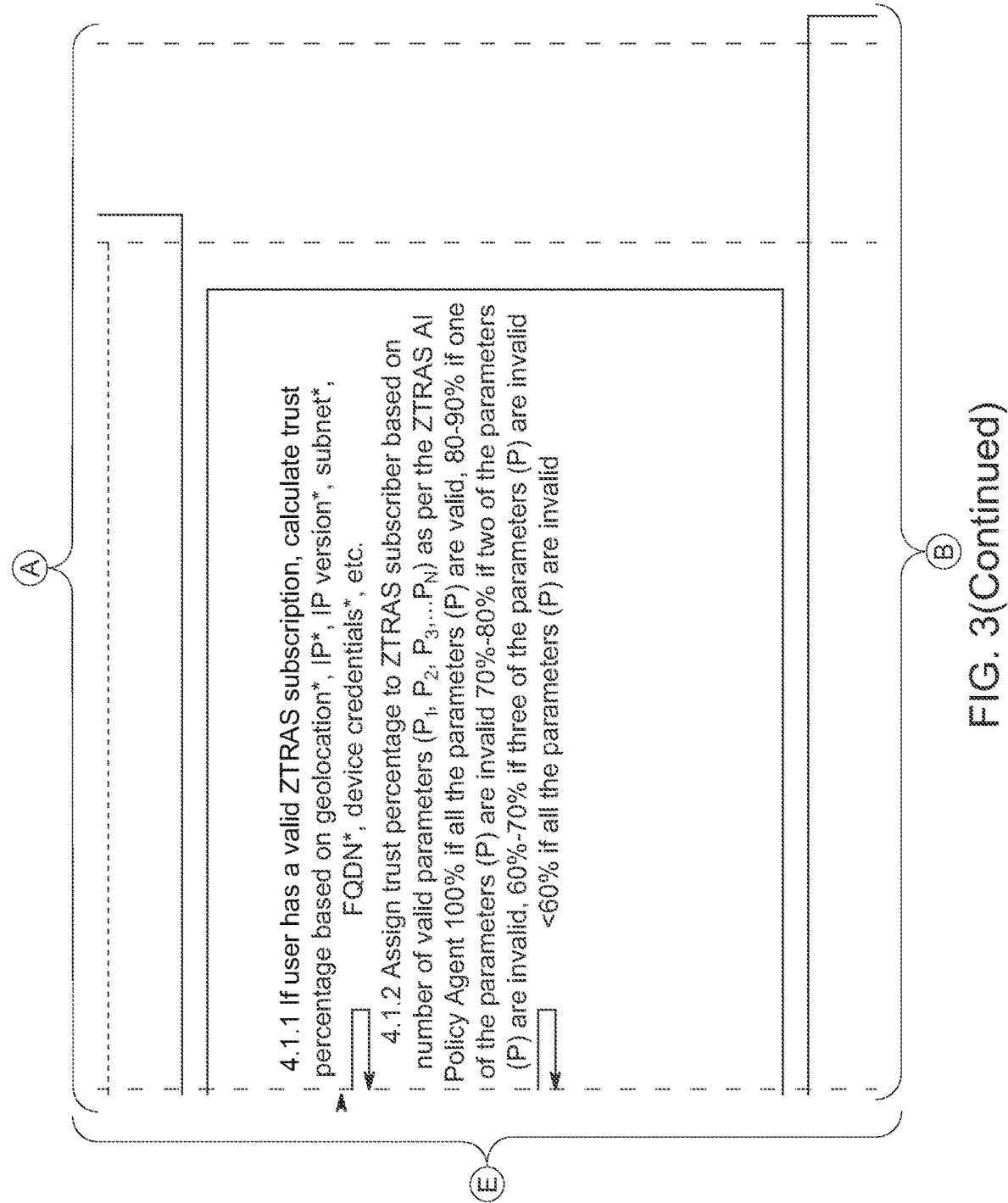
Figure 3:
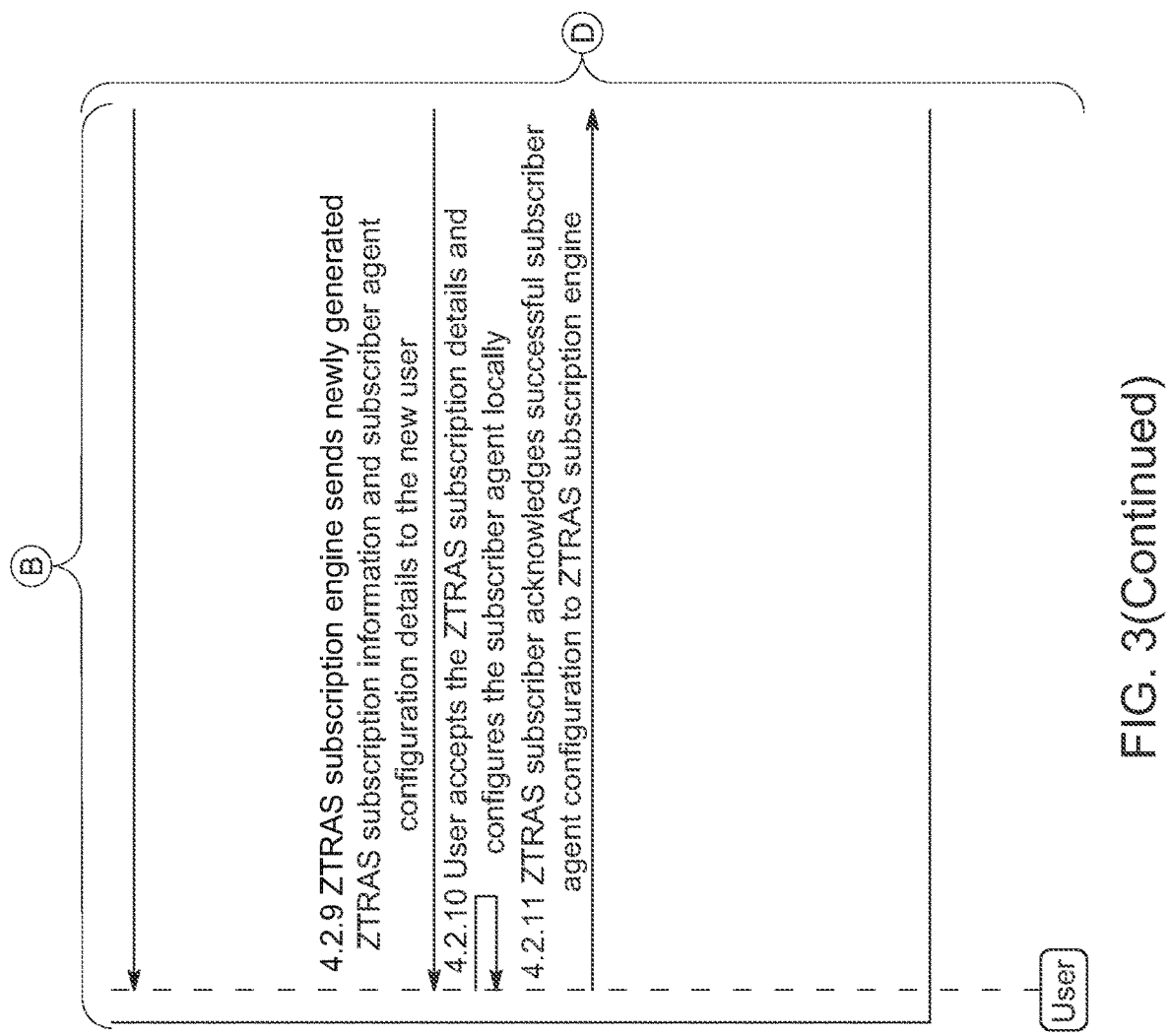
Figure 3:
Figure 3:
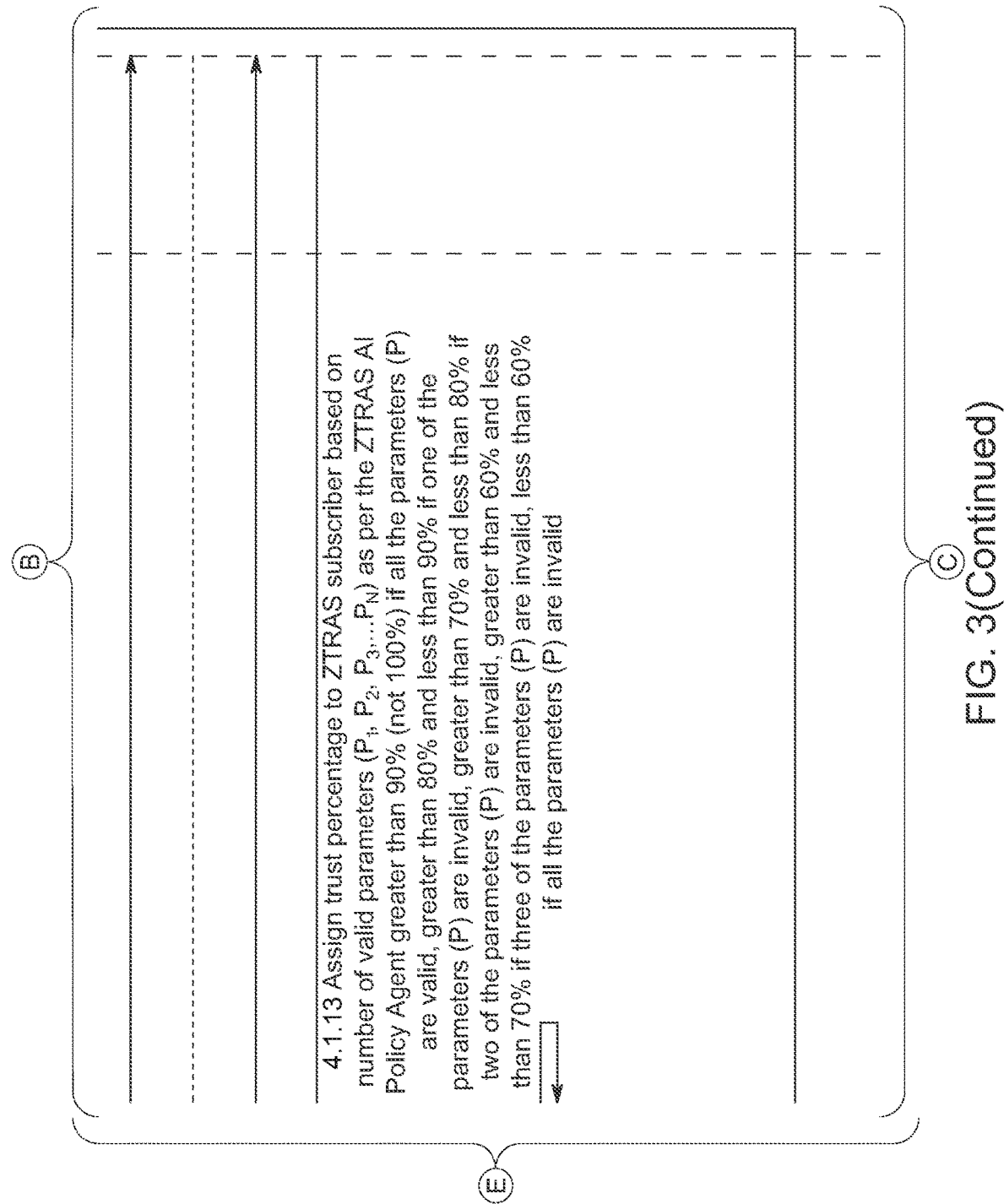
Figure 3:
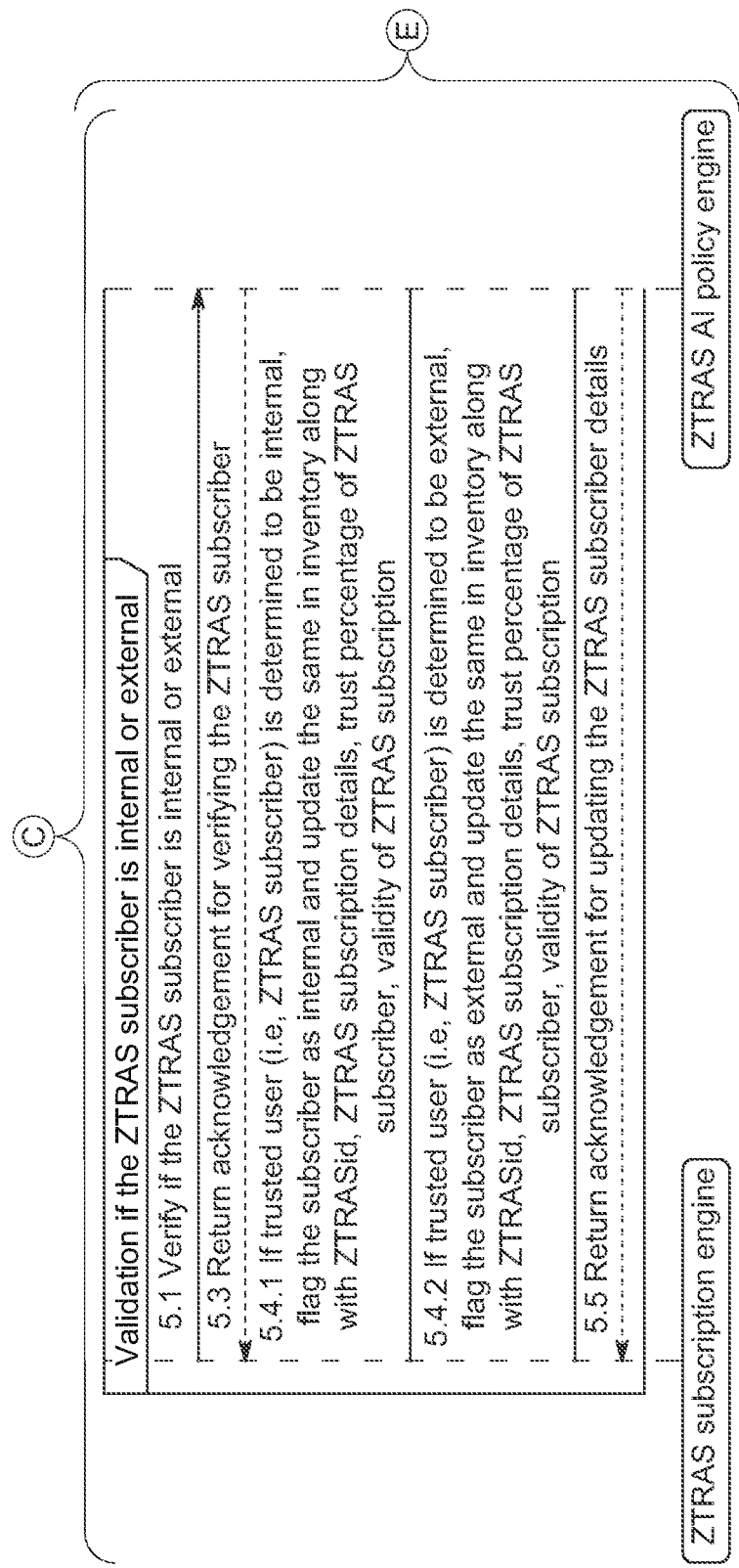
Figure 3:
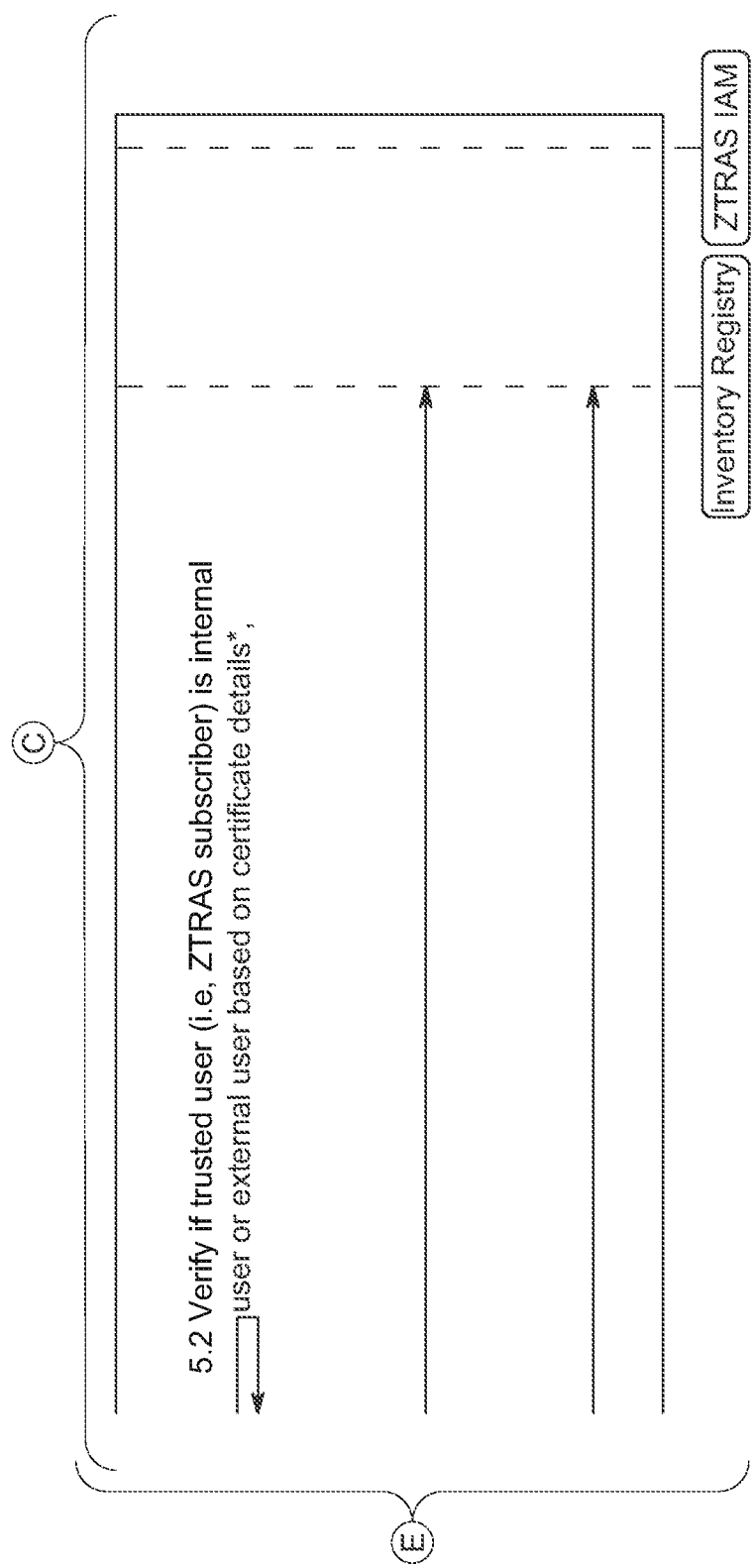

FIG. 3 illustrates a login call flow for an untrusted user (ZTRAS subscriber) login according to an embodiment. In the example of FIG. 3, an incoming request is considered to be from an untrusted user or from a trusted user for which a context has changed or for which a session is no longer valid (e.g., a log-in session).

Referring to FIG. 3, at (1), an untrusted user (or trusted user for which context has changed) tries or requests to access a node (i.e., target node) in the network. The request is transmitted from the untrusted user (i.e., a node of the untrusted user) to the ZTRAS subscription engine.

At (2.1), the ZTRAS subscription engine determines if a type of the request (i.e., request type) is HTTP/HTTPS or TCP (via HTTP CONNECT).

At (2.2), if the request type is determined to be HTTP/HTTPS, the ZTRAS subscription engine aggregates request attributes such as at least one of total number of requests, request count per unit time, source IP (src_ip), HTTP method (http_method), HTTP header, HTTP path, allowed set of ports (allowed_ports), language in the request, cookies, query string in the request, body of the request, geolocation of the user (e.g., untrusted user), timestamp of the request, time zone of the user, etc.

At (2.3), if the request type is TCP, the ZTRAS subscription engine aggregates request attributes such as at least one of total number of requests, request count per unit time, source IP, allowed set of ports, language in the request, cookies, query string in the request, geolocation of the requesting user, timestamp of the request, time zone of the user, etc.

At (2.4), the ZTRAS subscription engine sends the aggregated request attributes to the ZTRAS AI Policy Engine to validate if the request is legitimate or not.

At (3.1), the ZTRAS AI Policy Engine flags or identifies (e.g., indicates) the request as legitimate if the input values of the request attributes are determined to be valid based on one or more policies (e.g., predefined policies), and returns the result (i.e., legitimate request) to the ZTRAS subscription engine.

At (3.2), the ZTRAS AI Policy Engine flags or identifies (e.g., indicates) the request as illegitimate if the input values of the request attributes are determined to be invalid based on the one or more policies, and returns the result (i.e., illegitimate request) to the ZTRAS subscription engine.

At (3.3), the ZTRAS subscription engine updates the session details (e.g., location, source IP, user-agent, access time, session expiry, security context, device posture, etc.) of the untrusted user in the inventory registry.

At (3.4), the inventory registry returns an acknowledgement to the ZTRAS subscription engine, to acknowledge updating the session details of the untrusted user.

At (3.5), the ZTRAS subscription engine drops the request if the request is determined to be illegitimate, and the process ends. Otherwise, the process proceeds to step (4).

At (4), the ZTRAS subscription engine forwards request details (e.g., session details) to the ZTRAS AI Policy Engine to verify if the request is from a trusted user (i.e., ZTRAS subscriber) or an untrusted user (e.g., a user that does not have a $ZTRAS_{id}$ or valid ZTRAS subscription). Where the request is from a valid ZTRAS subscriber (trusted user), the call flow proceeds to steps 4.1.1 through 4.1.4 to validate the trust (even if a context has not changed). According to another embodiment, the ZTRAS AI Policy Engine may further determine whether the context (e.g., user context or request context) changes (e.g., geolocation, IP address, IP version, etc.) based on parameters such as session history, inventory registry, ZTRAS subscription, etc. The ZTRAS AI Policy Engine may be provided with the parameters from the inventory registry. In this alternate embodiment, if the request is from a trusted user but the context has not changed, the call flow proceeds to steps 4.1.1 through 4.1.3 (in this case, a validity period may not be recalculated where the context has not changed). According to still another embodiment, if the request is from the trusted user for which the context has not changed, the trust percentage is not recalculated and the call flow proceeds to steps (4.2.1) through (4.2.15).

At (4.1.1), the ZTRAS AI Policy Engine calculates a trust percentage based on request parameters, such as at least one of geolocation, IP address, IP version, IP subnet, FQDN, device credentials, etc. For example, the ZTRAS AI Policy Engine may determine validity of each of the request parameters based on one or more predefined rules. In this regard, validity is determined based on criteria defined in a policy. For example, the policy may define a particular geolocation (e.g., Japan) as a valid geolocation. In this case, if the location of the user is outside of Japan, then the geolocation request parameter would be invalid.

At (4.1.2), the ZTRAS AI Policy Engine assigns a "trust percentage" to the ZTRAS subscriber based on the number of valid request parameters ($P_1, P_2, P_3 \ldots P_N$). For example, the trust percentage may be set as follows: 100%—if all the parameters (P) are valid, greater than 80% and less than 90%—if one of the parameters (P) is invalid, greater than 70% and less than 80%—if two of the parameters (P) are invalid, greater than 60% and less than 70%—if three of the parameters (P) are invalid, less than 60%—if all the parameters (P) are invalid. Furthermore, the calculation of trust percentage based on the validity of the parameters may be customized or may vary based on a particular policy. For example, if the policy requires the location of the user to be in Japan for there to be any trust at all, then the trust percentage would be 0% if the user is located outside of Japan even if every other parameter is valid.

At (4.1.3), the ZTRAS AI Policy Engine returns the trust percentage to the ZTRAS subscription engine.

At (4.1.4), the ZTRAS subscription engine sets the validity period for the ZTRAS subscription based on the trust percentage. For example, the validity period may be set as follows: greater than 90%—validity period is set to active for 90 days, greater than 80% and less than 90%—validity period is set to active for 24 hours, greater than 70% and less than 80%—validity period is set to active for 12 hours, greater than 60% and less than 70%—validity period is set to active for 6 hours, less than 60%—validity period is set to active for 1 hour. According to another embodiment, the validity period may not be reset if the user is a trusted user for which the context has not changed. The process then proceeds to step (4.3).

Meanwhile, if the ZTRAS AI Policy Engine determines that the request is from an untrusted user (e.g., the user does not have a valid ZTRAS subscription) at (4), then the call flow proceeds to steps (4.2.1) through (4.2.15). At (4.2.1), the ZTRAS AI Policy Engine will flag or identify the user as an untrusted user and return the result to the ZTRAS subscription engine.

At (4.2.2), the ZTRAS subscription engine requests the untrusted user for ZTRAS subscription details. For example, the ZTRAS subscription engine may provide (e.g., transmit) a one-time onboarding hyperlink (web URL) to the untrusted user.

At (4.2.3), the untrusted user sends the ZTRAS subscription details to the ZTRAS subscription engine. By way of example, the subscription details may include at least one of first name, last name, email address, phone number, existing identities, etc.

At (4.2.4), the ZTRAS subscription engine updates the ZTRAS subscription details in the inventory registry.

At (4.2.5), the inventory registry returns an acknowledgement for updating the ZTRAS subscription details.

At (4.2.6), the ZTRAS subscription engine validates the ZTRAS subscription details and registers the user (i.e., ZTRAS subscriber) to the ZTRAS IAM.

At (4.2.7), the ZTRAS IAM returns an acknowledgement for registration of the new ZTRAS subscriber, to the ZTRAS subscription engine.

At (4.2.8), the ZTRAS subscription engine generates a new $ZTRAS_{id}$ and ZTRAS subscription with subscriber agent configuration details (e.g., $ZTRAS_{id}$, trust percentage, validity period, location, timestamp, etc.) for the new ZTRAS subscriber.

At (4.2.9), the ZTRAS subscription engine sends the newly generated ZTRAS subscription information and subscriber agent configuration details to the user (i.e., ZTRAS subscriber).

At (4.2.10), the user (i.e., ZTRAS subscriber) accepts the ZTRAS subscription details and configures the subscriber agent locally based on the configuration details. In accordance with one or more example embodiments, any request to access the network is through the subscriber agent that appends the $ZTRAS_{id}$ to the request.

At (4.2.11), the user (i.e., ZTRAS subscriber) sends an acknowledgement for successful subscriber agent configuration to the ZTRAS subscription engine.

At (4.2.12), the ZTRAS subscription engine forwards the $ZTRAS_{id}$, ZTRAS subscription details and request parameters to the ZTRAS AI Policy Engine for calculation of the trust percentage. The request parameters may include at least one of geolocation, IP address, IP version, IP subnet, FQDN, device credentials, etc.

At (4.2.13), the ZTRAS AI Policy Engine assigns a "trust percentage" to the ZTRAS subscriber based on the number of valid request parameters ($P_1, P_2, P_3 \ldots P_N$). For example, the trust percentage may be determined as follows: greater than 90% (not 100% as this is a newly onboarded subscriber)—if all the parameters (P) are valid, greater than 80% and less than 90%—if one of the parameters (P) is invalid, greater than 70% and less than 80%—if two of the parameters (P) are invalid, greater than 60% and less than 70%—if three of the parameters (P) are invalid, less than 60%—if all the parameters (P) are invalid.

At (4.2.14), the ZTRAS AI Policy Engine returns the trust percentage to the ZTRAS subscription engine.

At (4.2.15), the ZTRAS subscription engine sets the validity period for the ZTRAS subscription based on the trust percentage. For example, the validity period may be determined or set as follows: greater than 90%—validity period is set to 24 hours, greater than 80% and less than 90%—validity period is set to 12 hours, greater than 70% and less than 80%—validity period is set to 6 hours, greater than 60% and less than 70%—validity period is set to 3 hours, less than 60%—validity period is set to 1 hour. The process then proceeds to step (4.3).

At (4.3), the ZTRAS subscription engine updates the request details in the policy engine for future reference.

At (4.4), the ZTRAS AI Policy Engine returns an acknowledgement for updating the request details for future reference.

At (5.1), the ZTRAS subscription engine forwards request details (e.g., at least one of $ZTRAS_{id}$, trust percentage and validity period, public certificate, email domain, target node FQDN, target node IP, etc.) to the ZTRAS AI Policy Engine to verify if the trusted user (i.e., ZTRAS subscriber such as previously-subscribed user per steps (4.1.1) through (4.1.4) or newly subscribed user per steps (4.2.1) through (4.2.15)) is an internal trusted user or an external trusted user.

At (5.2), the ZTRAS AI Policy Engine verifies if the trusted user (i.e., ZTRAS subscriber) is an internal trusted user or an external trusted user based on parameters such as certificate details (e.g., based on whether the certificate authority (CA) is of the mobile operator or external such as vendor CA or public CA), email domain, target node FQDN, target node IP, etc.

At (5.3), the ZTRAS AI Policy Engine returns the result of the verification to the ZTRAS subscription engine.

At (5.4.1), the ZTRAS subscription engine flags or identifies the trusted user (i.e., ZTRAS subscriber) as internal if the result of the verification determines the subscriber as internal and updates the flag or identification in the inventory registry. Here, the update may update the flag or identification along with the $ZTRAS_{id}$, trust percentage of ZTRAS subscriber, and the validity period of the ZTRAS subscription.

At (5.4.2), the ZTRAS subscription engine flags or identifies the trusted user (i.e., ZTRAS subscriber) as external if the result of the verification determines the subscriber as external and updates the ZTRAS subscriber as an external trusted user in the inventory registry. Here, the ZTRAS subscription engine will update the ZTRAS subscriber as an external trusted user along with the $ZTRAS_{id}$, trust percentage of ZTRAS subscriber, and the validity period of the ZTRAS subscription.

At (5.5), the inventory registry returns an acknowledgement for updating the ZTRAS subscriber details to the ZTRAS subscription engine.

The internal or external trusted user may thereby access the network (e.g., access a target node) based on the validity period of the ZTRAS subscription.

According to an embodiment, steps (4) through (4.1.4) and steps (4.3) through (5.5) are performed for all trusted users, even those for which context has not changed (in which case the trust percentage will not change as well). That is, according to an embodiment, every incoming request is validated regardless of trust (i.e., zero-trust).

Use Case 2: Internal Trusted User (ZTRAS Subscriber) Login

Figure 4:
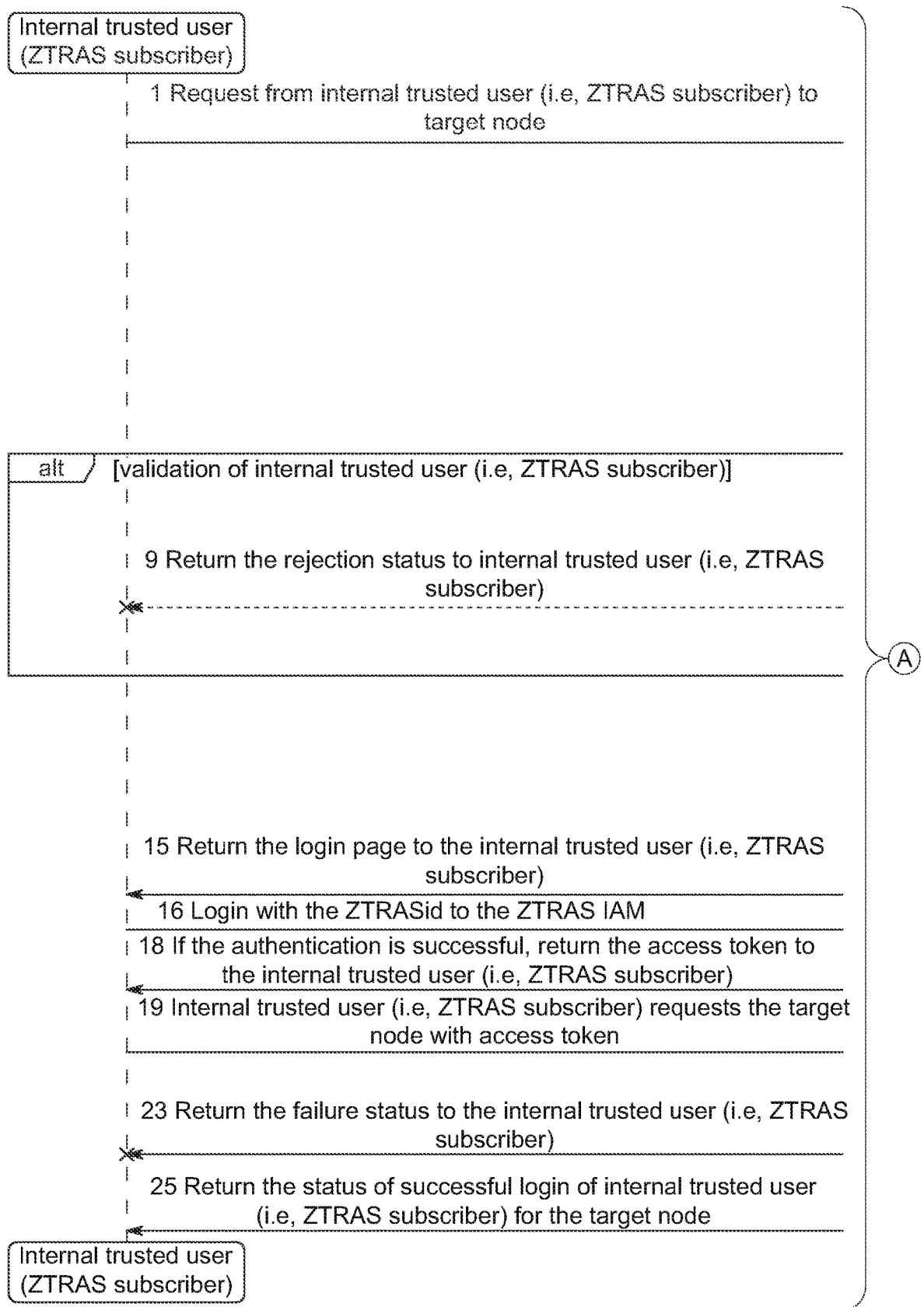
FIG. 4 illustrates a login call flow for an internal trusted user according to an embodiment.
Figure 4:
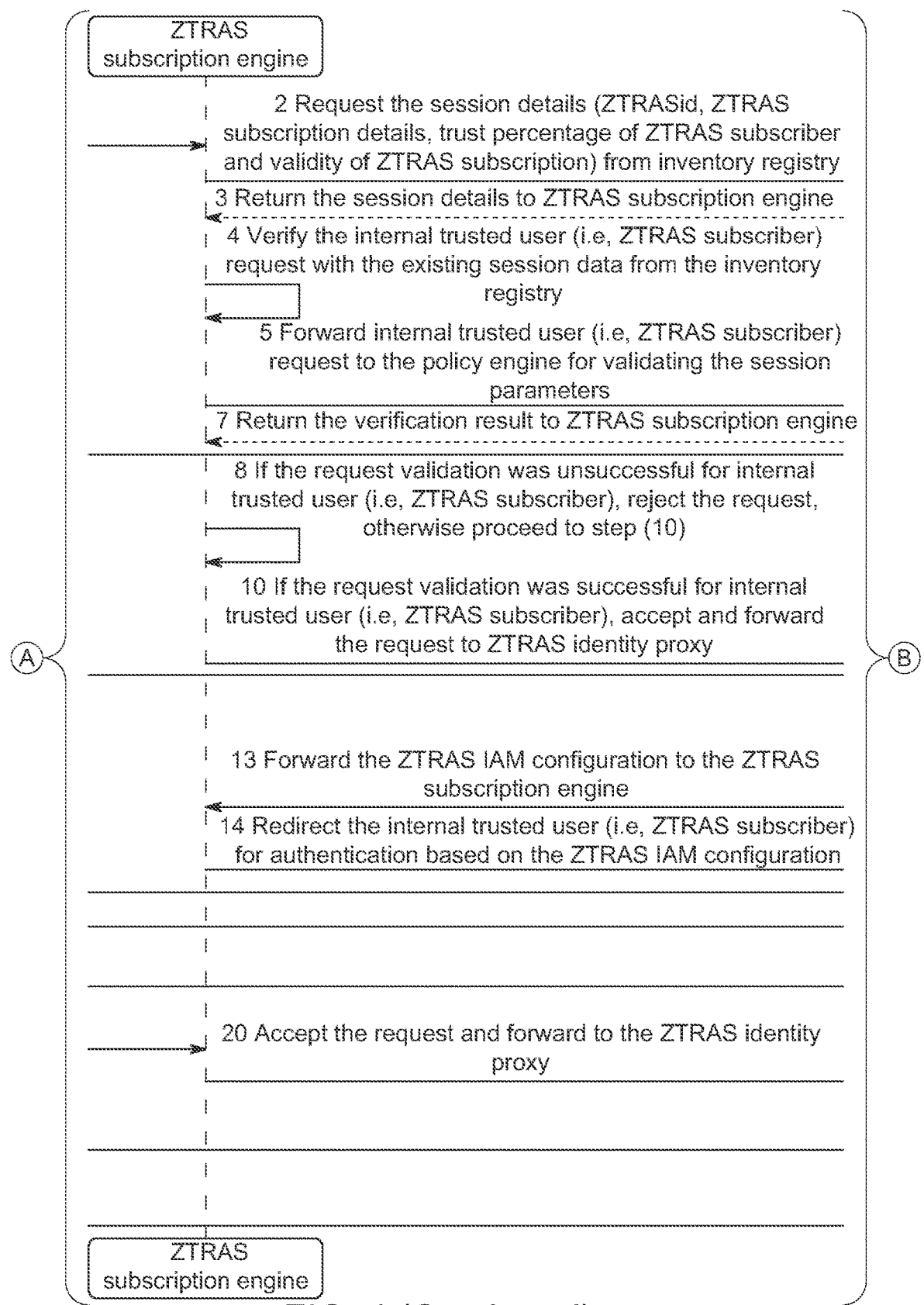
Figure 4:
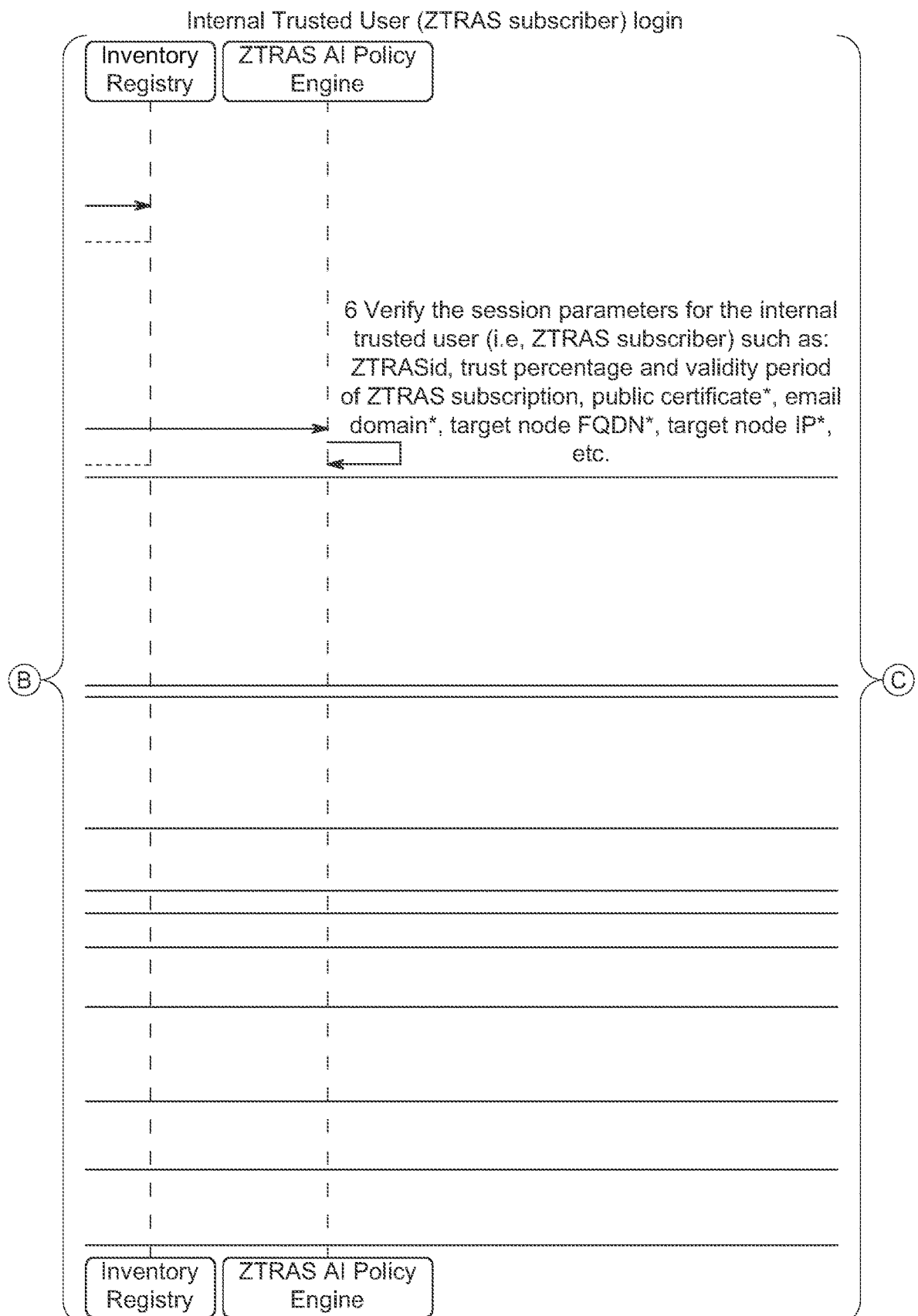
Figure 4:
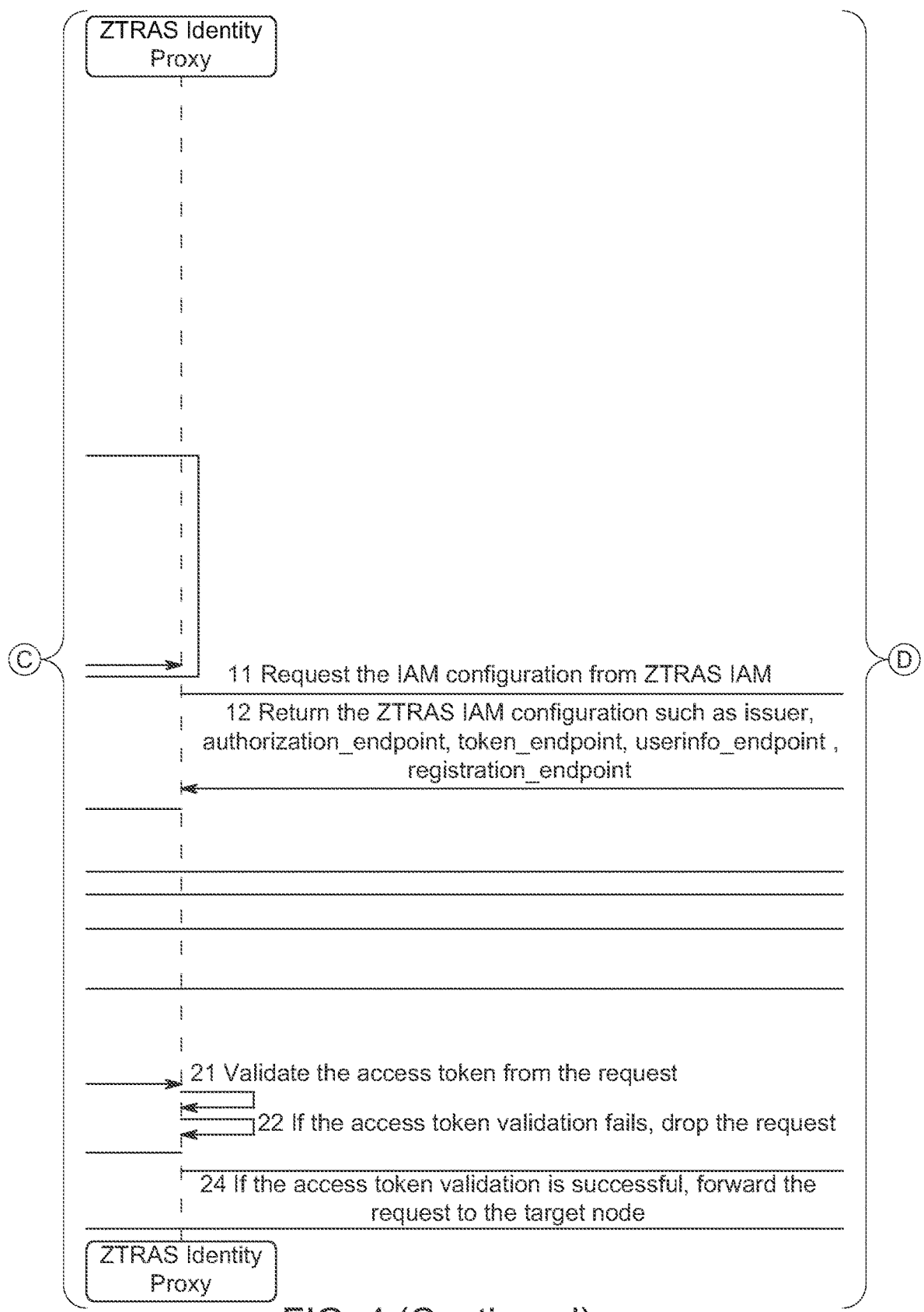
Figure 4:
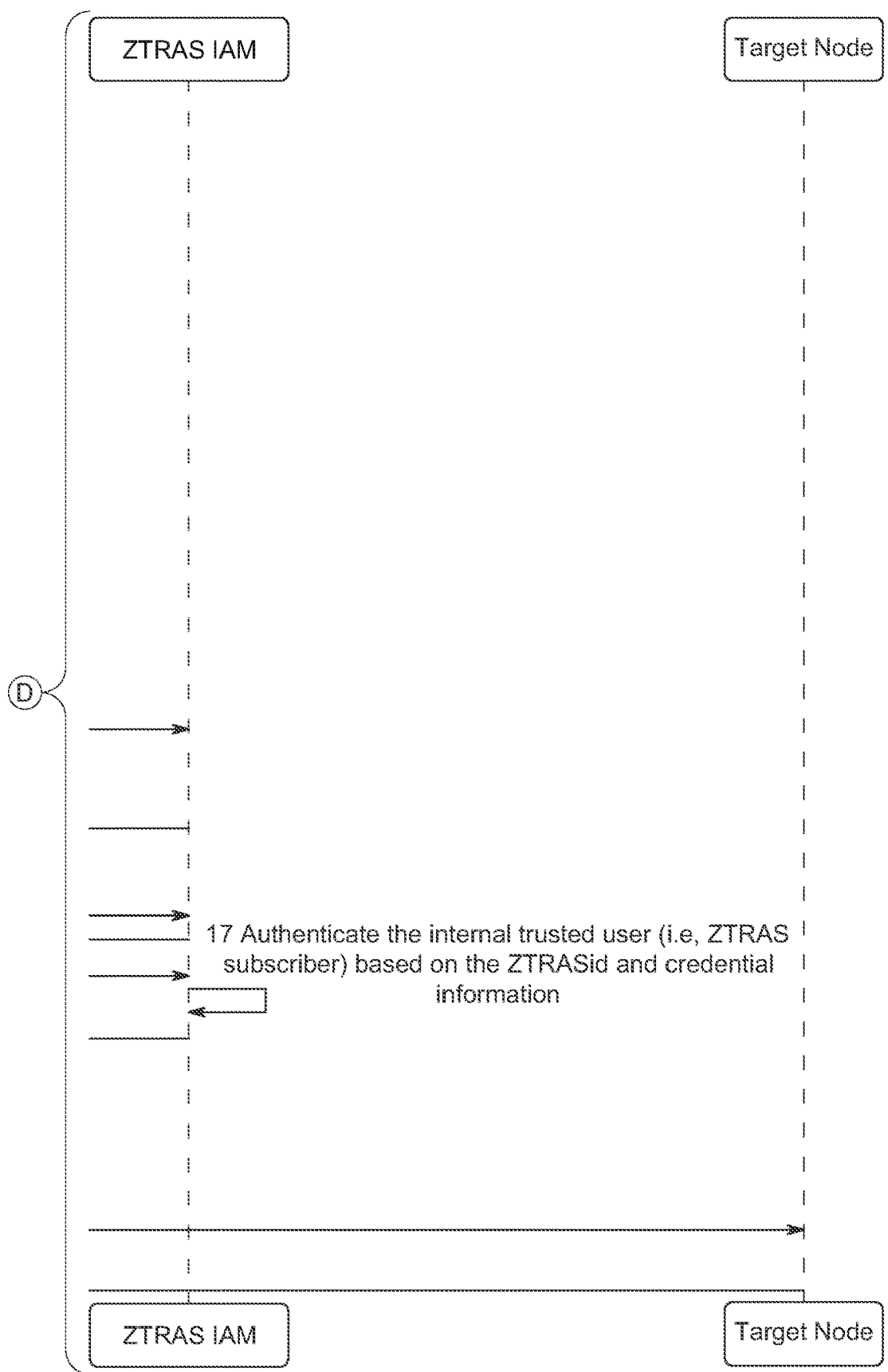

FIG. 4 illustrates a login call flow for an internal trusted user according to an embodiment. In the example of FIG. 4, an incoming request is considered to be from an internal trusted user (i.e., ZTRAS subscriber) with valid session details. For example, the call flow of FIG. 4 may proceed from the end of the call flow of FIG. 3. According to another embodiment, the call flow of FIG. 4 may proceed from step (4) of FIG. 3 where the user is determined to be trusted and the context has not changed.

Referring to FIG. 4, at (1), a trusted internal user (i.e., ZTRAS subscriber) tries or requests to access a node (i.e., target node) in the network. The request is transmitted from the trusted user to the ZTRAS subscription engine.

At (2), the ZTRAS subscription engine requests session details such as at least one of $ZTRAS_{id}$, ZTRAS subscription details, trust percentage of ZTRAS subscriber, validity of ZTRAS subscription, etc., from the inventory registry. In an example embodiment, the session details may be requested from the inventory registry based on a $ZTRAS_{id}$ appended to or included in the request received from the external trusted user (e.g., using the $ZTRAS_{id}$ as a primary key or lookup parameter).

At (3), the inventory registry returns the session details to the ZTRAS subscription engine.

At (4), the ZTRAS subscription engine verifies the internal trusted user (i.e., internal ZTRAS subscriber) request with the existing session data from the inventory registry. For example, the ZTRAS subscription engine may compare the session parameters in the incoming request with the stored session parameters to determine if the current request is for or part of an existing session or not. According to another embodiment, step (4) may be omitted (e.g., where the session details are previously validated in (4.1.1) of FIG. 3).

At (5), the ZTRAS subscription engine forwards the internal trusted user (i.e., internal ZTRAS subscriber) request to the policy engine for validating the session parameters. For example, the ZTRAS subscription engine validates that existing session data is still applicable and/or that the user is truly internal.

At (6), the policy engine validates the session parameters for the internal trusted user such as at least one of $ZTRAS_{id}$, ZTRAS subscription details, trust percentage of ZTRAS subscriber, validity of ZTRAS subscription, internal certificate details, email domain, target node FQDN, target node IP, etc., based on predefined policies. For example, the validation of session parameters in (6) may be to validate that the session parameters comply with a policy or access requirements of the target node.

At (7), the policy engine returns the verification result to the ZTRAS subscription engine.

At (8), if the request validation was unsuccessful for the internal trusted user (i.e., ZTRAS subscriber), the ZTRAS subscription engine rejects the request and the process proceeds to step (9). Otherwise, the process proceeds to step (10).

At (9), the ZTRAS subscription engine returns a rejection status to the internal trusted user (i.e., ZTRAS subscriber), and the process ends.

At (10), if the request validation was successful for the internal trusted user (i.e., internal ZTRAS subscriber), the ZTRAS subscription engine accepts and forwards the request to the ZTRAS identity proxy.

At (11), the ZTRAS identity proxy requests an IAM configuration from the ZTRAS IAM. Here, the ZTRAS IAM may differ or utilize different identity management backend resources for an internal user versus an external user.

At (12), the ZTRAS IAM returns the ZTRAS IAM configuration such as at least one of issuer, authorization_endpoint, token_endpoint, userinfo_endpoint, registration_endpoint, etc., to the ZTRAS identity proxy. The configuration parameters may vary based on whether the user is an internal user or an external user.

At (13), the ZTRAS identity proxy forwards the ZTRAS IAM configuration to the ZTRAS subscription engine.

At (14), the ZTRAS subscription engine redirects the internal trusted user (i.e., internal ZTRAS subscriber) request to the ZTRAS IAM for authentication based on the ZTRAS IAM configuration.

At (15), the ZTRAS IAM returns a login page to the internal trusted user (i.e., internal ZTRAS subscriber).

At (16), the internal trusted user (i.e., internal ZTRAS subscriber) logs in to the ZTRAS IAM with their $ZTRAS_{id}$.

At (17), the ZTRAS IAM authenticates the internal trusted user (i.e., internal ZTRAS subscriber) based on the $ZTRAS_{id}$ and credential information.

At (18), if the authentication is successful, the ZTRAS IAM returns an access token to the internal trusted user (i.e., internal ZTRAS subscriber). For example, the IAM may generate the access token.

At (19), the internal trusted user (i.e., internal ZTRAS subscriber) uses the access token to access the target node in the network through the ZTRAS subscription engine.

At (20), the ZTRAS subscription engine forwards the internal trusted user (i.e., internal ZTRAS subscriber) request to the identity proxy for validation.

At (21), the ZTRAS identity proxy validates the access token from the request.

At (22), if the access token validation fails, the ZTRAS identity proxy rejects the request and the process proceeds to step (23). Otherwise, the process proceeds to step (24).

At (23), the ZTRAS identity proxy returns a rejection status to the internal trusted user (i.e., internal ZTRAS subscriber) and the process ends.

At (24), if the access token validation was successful, the ZTRAS identity proxy forwards the request to the target node.

At (25), the target node returns the status of successful login to the internal trusted user (i.e., internal ZTRAS subscriber).

Use Case 3: External Trusted User (ZTRAS Subscriber) Login

Figure 5:
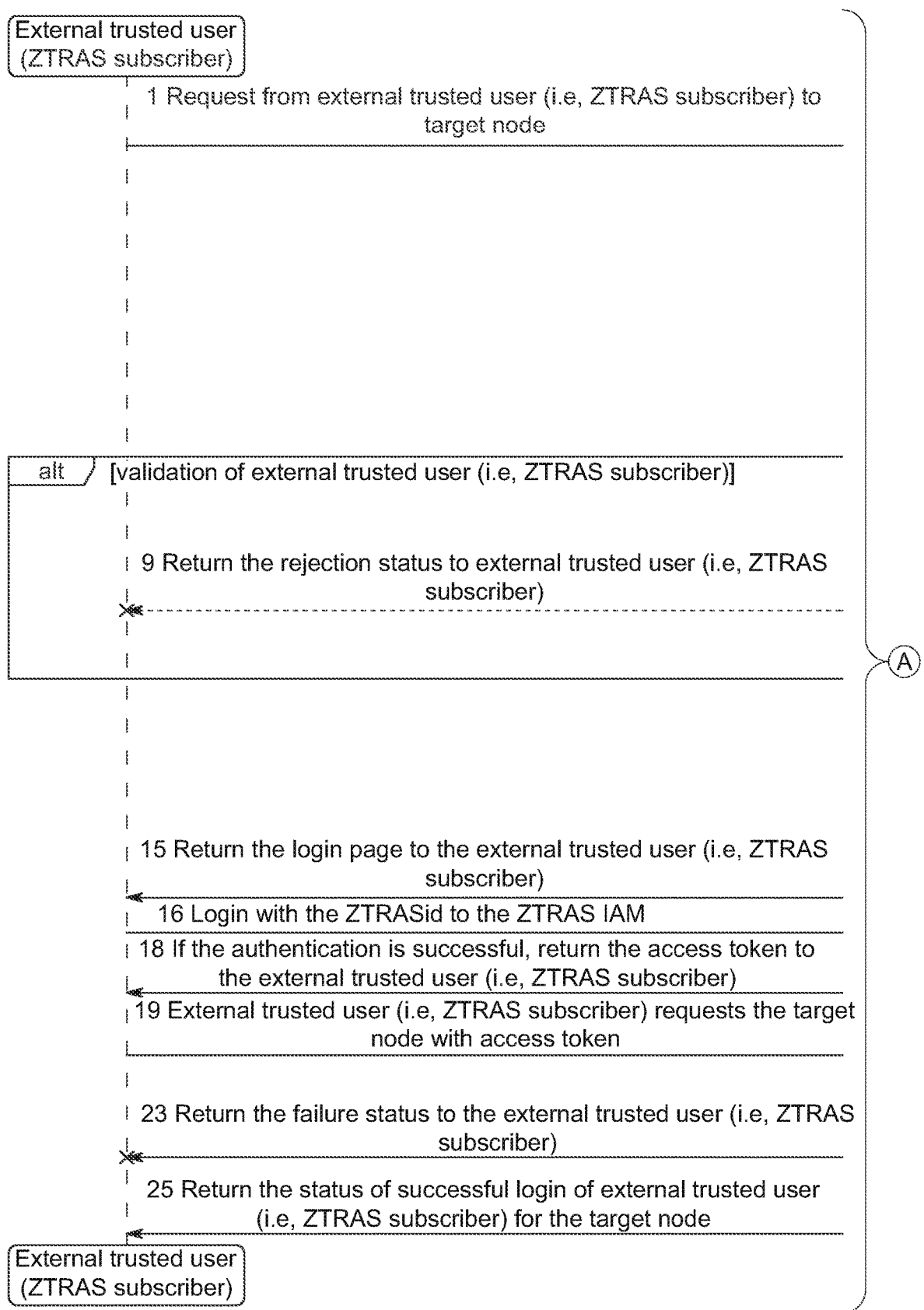
FIG. 5 illustrates a login call flow for an external trusted user according to an embodiment.
Figure 5:
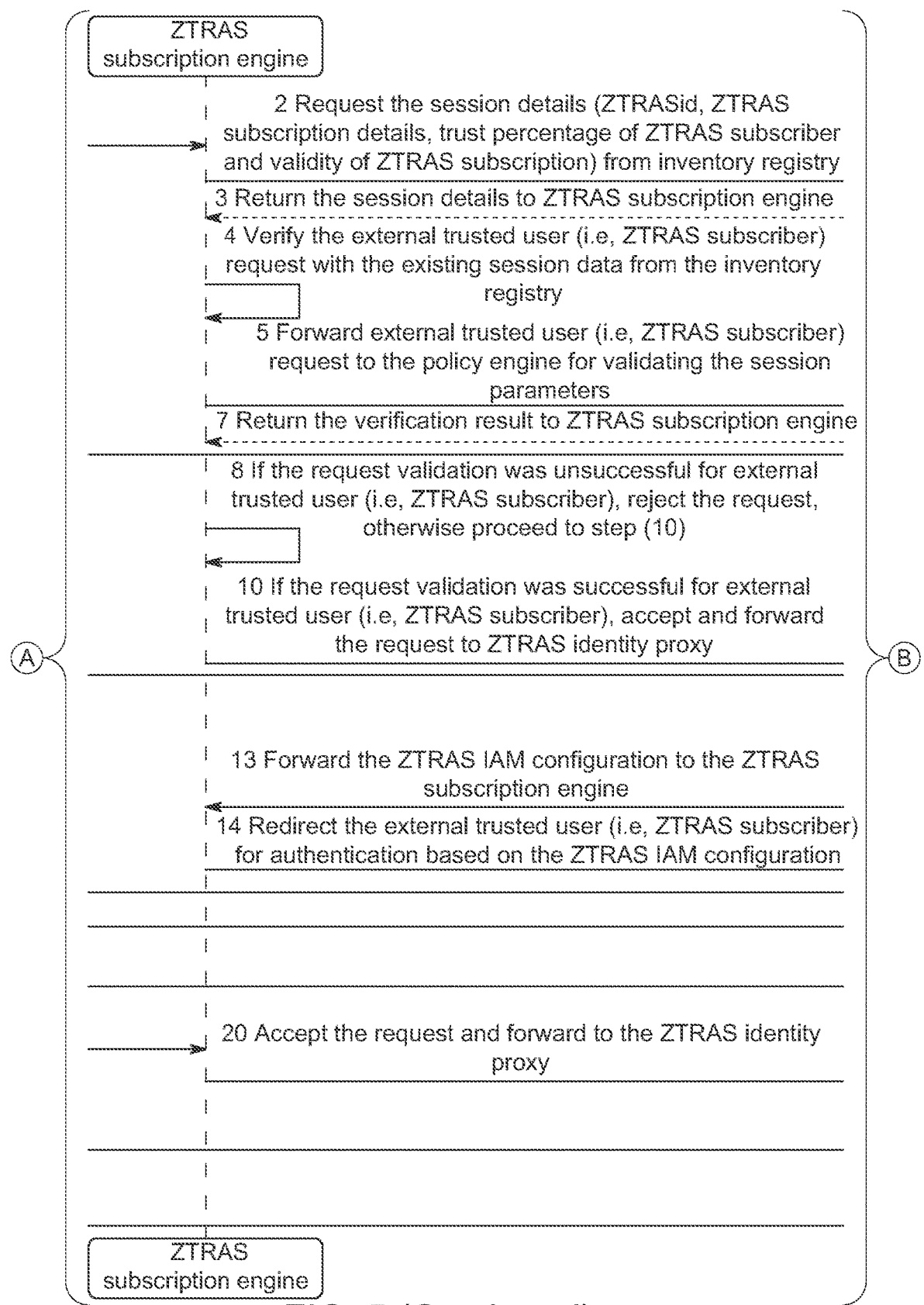
Figure 5:
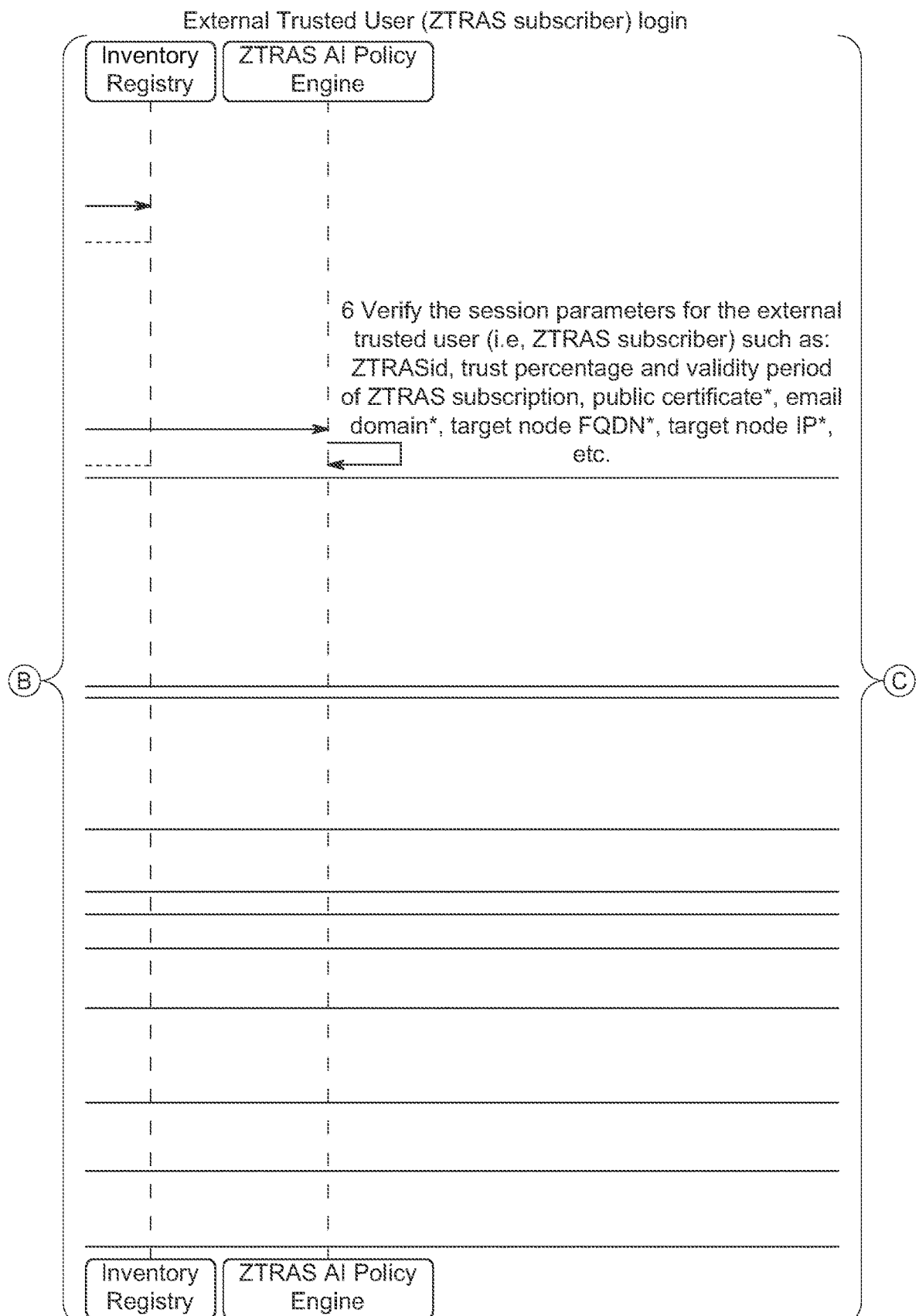
Figure 5:
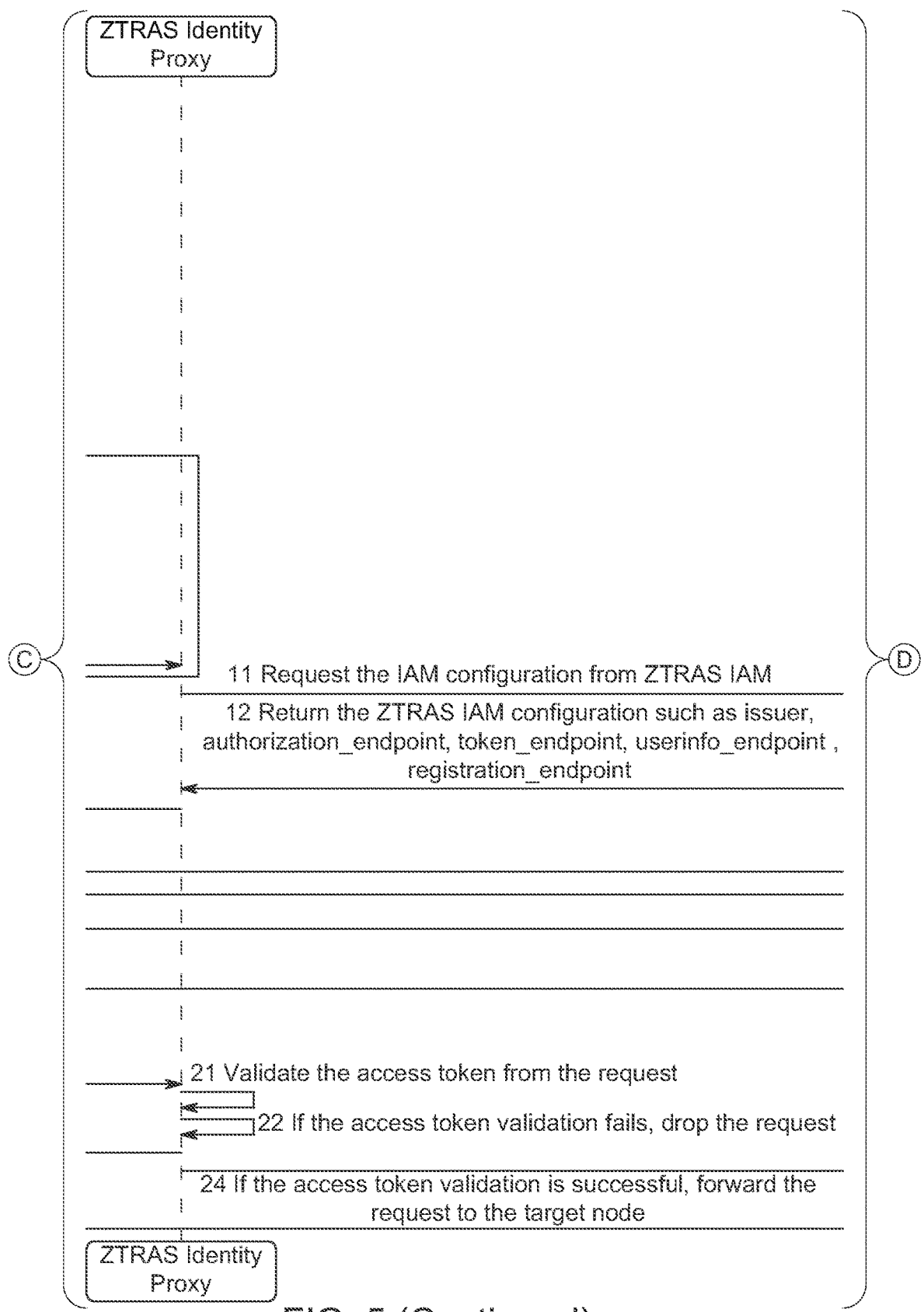
Figure 5:
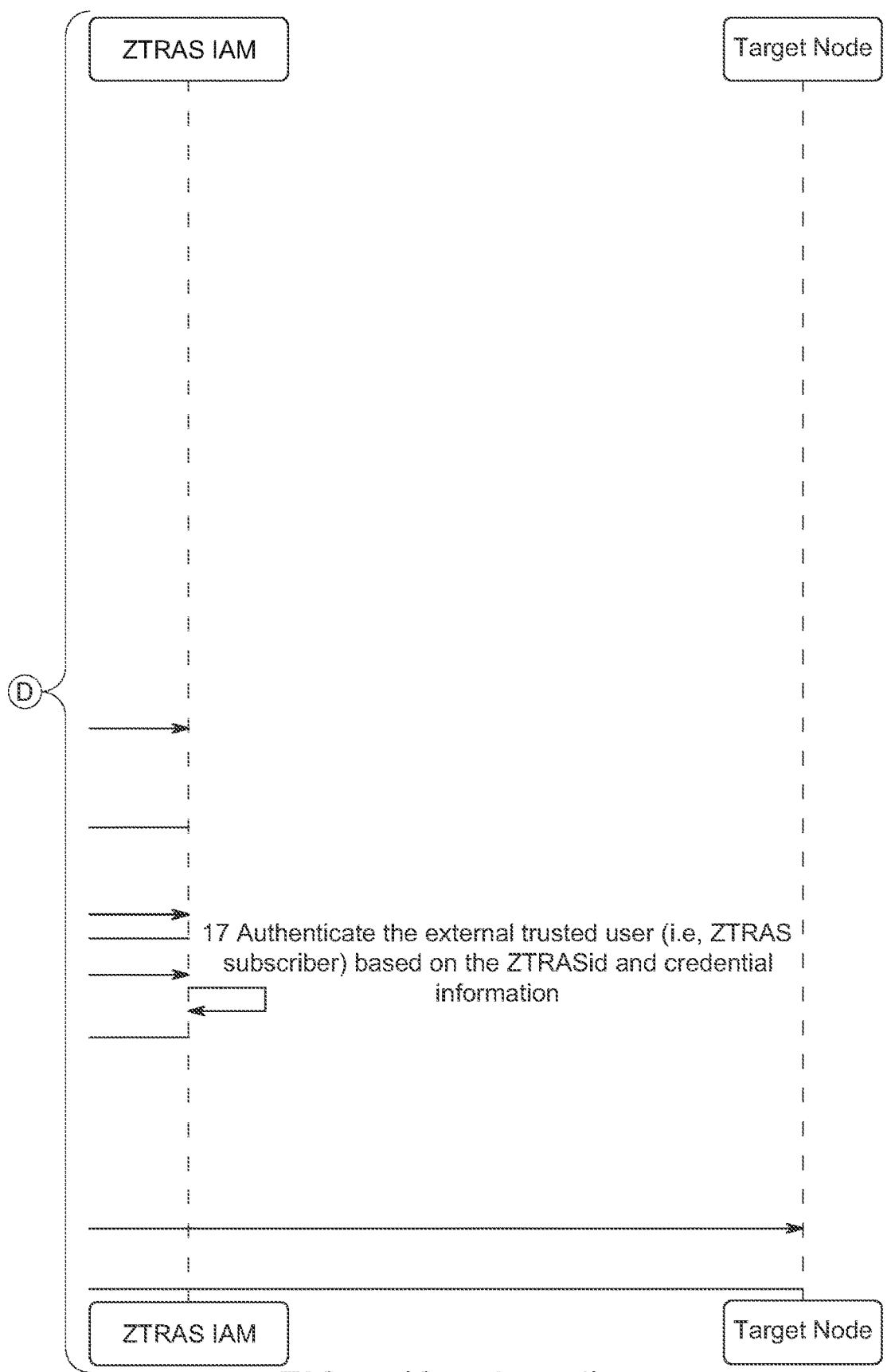

FIG. 5 illustrates a login call flow for an external trusted user according to an embodiment. In the example of FIG. 5, an incoming request is considered to be from an external trusted user (i.e., ZTRAS subscriber). For example, the call flow of FIG. 5 may proceed from the end of the call flow of FIG. 3. According to another embodiment, the call flow of FIG. 5 may proceed from step (4) of FIG. 3 where the user is determined to be trusted and the context has not changed.

Referring to FIG. 5, at (1), an external trusted user (i.e., external ZTRAS subscriber) tries or requests to access a node in the network. The request is transmitted from the untrusted user to the ZTRAS subscription engine.

At (2), the ZTRAS subscription engine requests session details such as at least one of $ZTRAS_{id}$, ZTRAS subscription details, trust percentage of ZTRAS subscriber, validity of ZTRAS subscription, etc., from the inventory registry. In an example embodiment, the session details may be requested from the inventory registry based on a $ZTRAS_{id}$ appended to or included in the request received from the external trusted user (e.g., using the $ZTRAS_{id}$ as a primary key or lookup parameter).

At (3), the inventory registry returns the session details to the ZTRAS subscription engine.

At (4), the ZTRAS subscription engine verifies the external trusted user request with the existing session data from the inventory registry. According to another embodiment, step (4) may be omitted (e.g., where the session details are previously validated in (4.1.1) of FIG. 3).

At (5), the ZTRAS subscription engine forwards the external trusted user request to the policy engine for validating the session parameters.

At (6), the policy engine validates the session parameters for the external trusted user such as at least one of $ZTRAS_{id}$, ZTRAS subscription details, trust percentage of ZTRAS subscriber, validity of ZTRAS subscription, third party (e.g., public) certificate details, email domain, target node FQDN, target node IP, etc., based on predefined policies. For example, the validation of session parameters in (6) may be to validate that the session parameters comply with a policy or access requirements of the target node.

At (7), the policy engine returns the verification result to the ZTRAS subscription engine.

At (8), if the request validation was unsuccessful for the external trusted user, the ZTRAS subscription engine rejects the request and proceeds to step (9). Otherwise, the process proceeds to step (10).

At (9), the ZTRAS subscription engine returns a rejection status to the external trusted user and the process ends.

At (10), if the request validation was successful for the external trusted user (i.e., ZTRAS subscriber), the ZTRAS subscription engine accepts and forwards the request to the ZTRAS identity proxy.

At (11), the ZTRAS identity proxy requests an IAM configuration from the ZTRAS IAM.

At (12), the ZTRAS IAM returns the ZTRAS IAM configuration such as at least one of issuer, authorization_endpoint, token_endpoint, userinfo_endpoint, registration_endpoint, etc., to the ZTRAS identity proxy.

At (13), the ZTRAS identity proxy forwards the ZTRAS IAM configuration to the ZTRAS subscription engine.

At (14), the ZTRAS subscription engine redirects the external trusted user request to the ZTRAS IAM for authentication based on the ZTRAS IAM configuration.

At (15), the ZTRAS IAM returns a login page to the external trusted user.

At (16), the external trusted user logs in to the ZTRAS IAM with their $ZTRAS_{id}$.

At (17), the ZTRAS IAM authenticates the external trusted user based on the $ZTRAS_{id}$ and credential information.

At (18), if the authentication is successful, the ZTRAS IAM returns an access token to the external trusted user.

At (19), the external trusted user uses the access token to access the target node in the network through the ZTRAS subscription engine.

At (20), the ZTRAS subscription engine forwards the external trusted user request to the identity proxy for validation.

At (21), the ZTRAS identity proxy validates the access token from the request.

At (22), if the access token validation fails, the ZTRAS identity proxy rejects the request and the process proceeds to step (23). Otherwise, the process proceeds to step (24).

At (23), the ZTRAS identity proxy returns a rejection status to the external trusted user and the process ends.

At (24), if the access token validation was successful, the ZTRAS identity proxy forwards the request to the target node.

At (25), the target node returns the status of successful login to the external trusted user.

Use Case 4: Generation of $ZTRAS_{id}$

Figure 6:
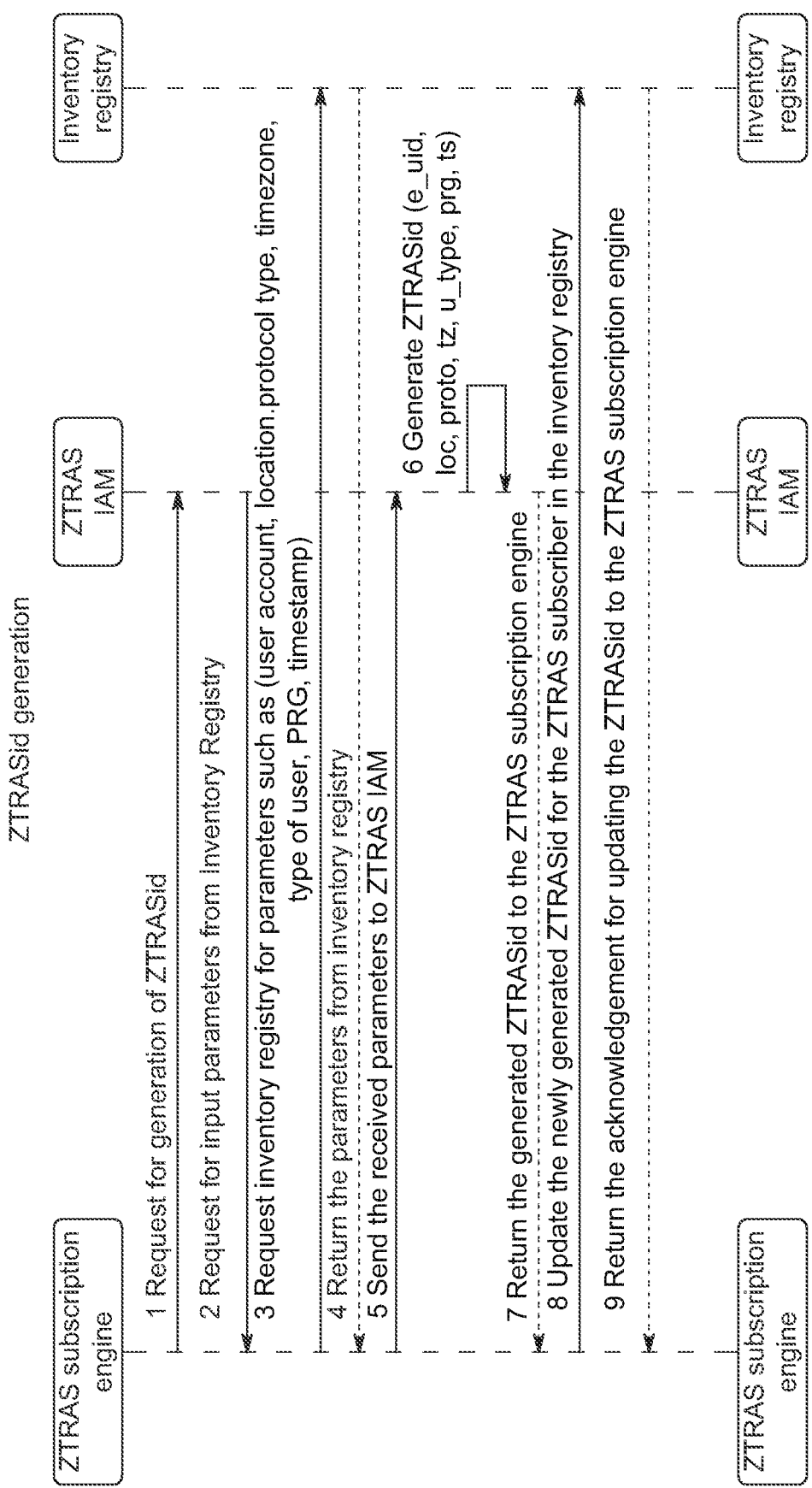
FIG. 6 illustrates a call flow for generating a $ZTRAS_{id}$ according to an embodiment.

FIG. 6 illustrates a call flow for generating an $ZTRAS_{id}$ according to an embodiment. In the example of FIG. 6, an inventory registry according to an embodiment is assumed to have input parameters (e.g., required parameters) for generation of a $ZTRAS_{id}$, such as at least one of user account, location, protocol type, time zone, type of user, pseudo-random generator (PRG), timestamp, etc. By way of example, the method of FIG. 6 may be performed for an untrusted user (e.g., previously unsubscribed or previously subscribed but for which a validity has expired), such as at step (4.2.8) of FIG. 3.

Referring to FIG. 6, at (1), the ZTRAS subscription engine requests the ZTRAS IAM to generate a $ZTRAS_{id}$ for the ZTRAS subscriber.

At (2), the ZTRAS IAM requests the ZTRAS subscription engine for the input parameters from the inventory registry.

At (3), the ZTRAS subscription engine requests the inventory registry for the input parameters such as at least one of user account (e_uid), location (loc), protocol type (proto), time zone (tz), type of user (u_type), PRG (pseudo-random generator), timestamp (ts), etc. The PRG may refer to an algorithm or information identifying a particular PRG.

At (4), the inventory registry returns the parameters from the inventory registry to the ZTRAS subscription engine.

At (5), the ZTRAS subscription engine sends the received parameters to the ZTRAS IAM.

At (6), the ZTRAS IAM generates the $ZTRAS_{id}$ (e_uid, loc,proto,tz,u_typ,prg,ts) based on the received parameters.

At (7), the ZTRAS IAM returns the generated $ZTRAS_{id}$ to the ZTRAS subscription engine.

At (8), the ZTRAS subscription engine updates the newly generated $ZTRAS_{id}$ for the ZTRAS subscriber in the inventory registry.

At (9), the inventory registry returns an acknowledgement for updating the $ZTRAS_{id}$ to the ZTRAS subscription engine.

Use Case 5: Disabling the Inactive ZTRAS Subscriber

Figure 7:
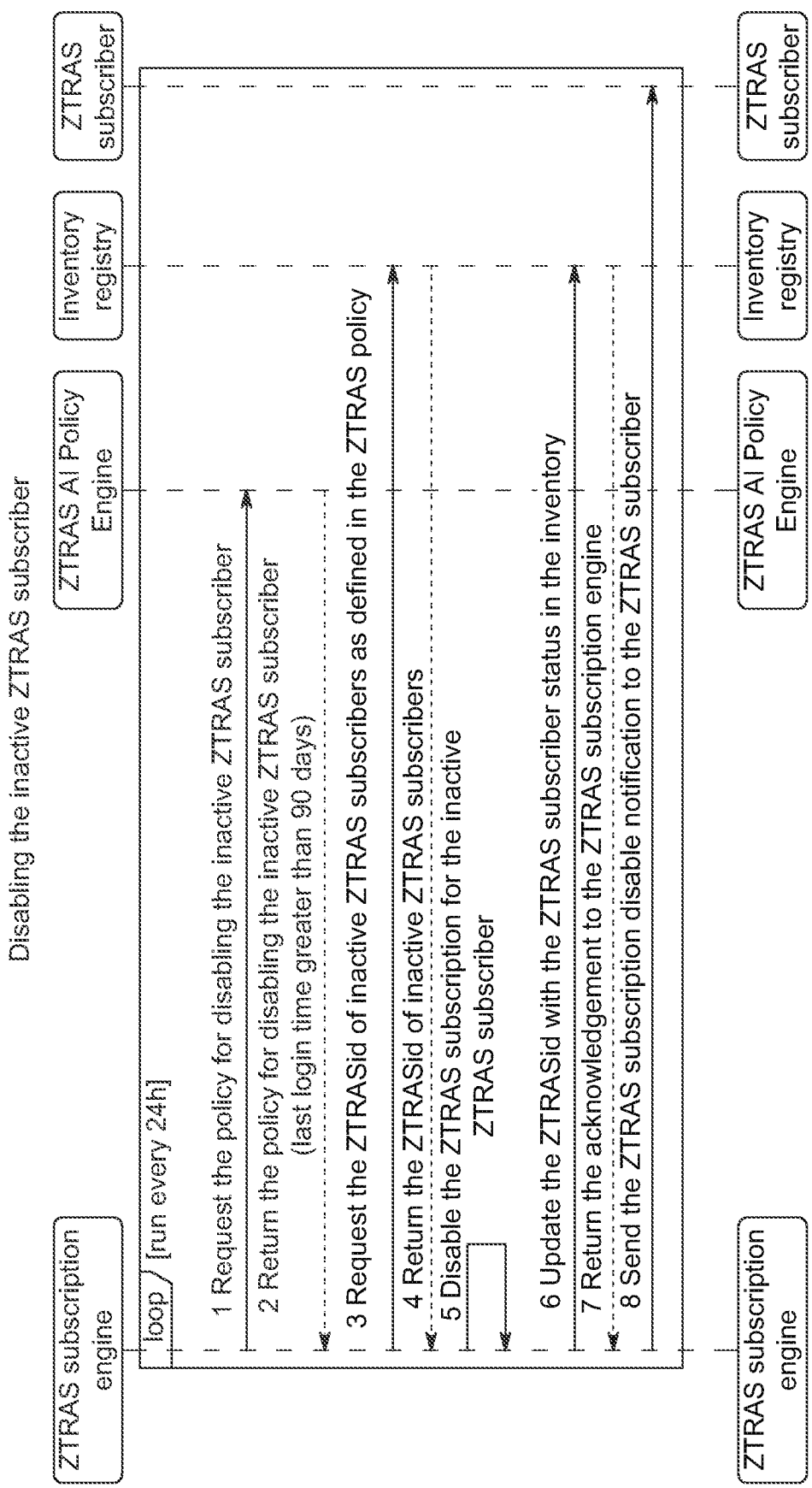
FIG. 7 illustrates a call flow for disabling an inactive ZTRAS subscriber according to an embodiment.

FIG. 7 illustrates a call flow for disabling an inactive ZTRAS subscriber according to an embodiment. In the example of FIG. 7, the ZTRAS subscription engine runs the check for disabling inactive subscribers based on a policy defined by the ZTRAS AI Policy Engine. By way of example, the check may occur in accordance with a predetermined schedule (e.g., once every 24 hours (daily)). It is understood that other example embodiments are not limited to this periodical check (e.g., the check may be event-based, user selected, based on a different predetermined periodicity, etc.).

Referring to FIG. 7, at (1), the ZTRAS subscription engine requests the policy for disabling the inactive ZTRAS subscriber from the policy engine.

At (2), the policy engine returns the policy for disabling the inactive ZTRAS subscriber. By way of example, the policy may define an inactive user to be disabled as one for which the last login time is greater than a predetermined threshold (e.g., 90 days).

At (3), the ZTRAS subscription engine requests the $ZTRAS_{id}$ of one or more (e.g., one, a predetermined number, or all) inactive ZTRAS subscribers as defined in the ZTRAS policy from the inventory registry.

At (4), the inventory registry returns the $ZTRAS_{id}$s of inactive ZTRAS subscribers to the ZTRAS subscription engine.

At (5), the ZTRAS subscription engine disables the ZTRAS subscription for the inactive ZTRAS subscribers.

At (6), the ZTRAS subscription engine updates the $ZTRAS_{id}$ with the ZTRAS subscriber status (e.g., disabled) in the inventory registry.

At (7), the inventory registry returns an acknowledgement for updating the subscriber status to the ZTRAS subscription engine.

At (8), the ZTRAS subscription engine sends the ZTRAS subscription disable notification to the disabled ZTRAS subscriber.

Use Case 6: Cancellation of Inactive ZTRAS Subscriber

Figure 8:
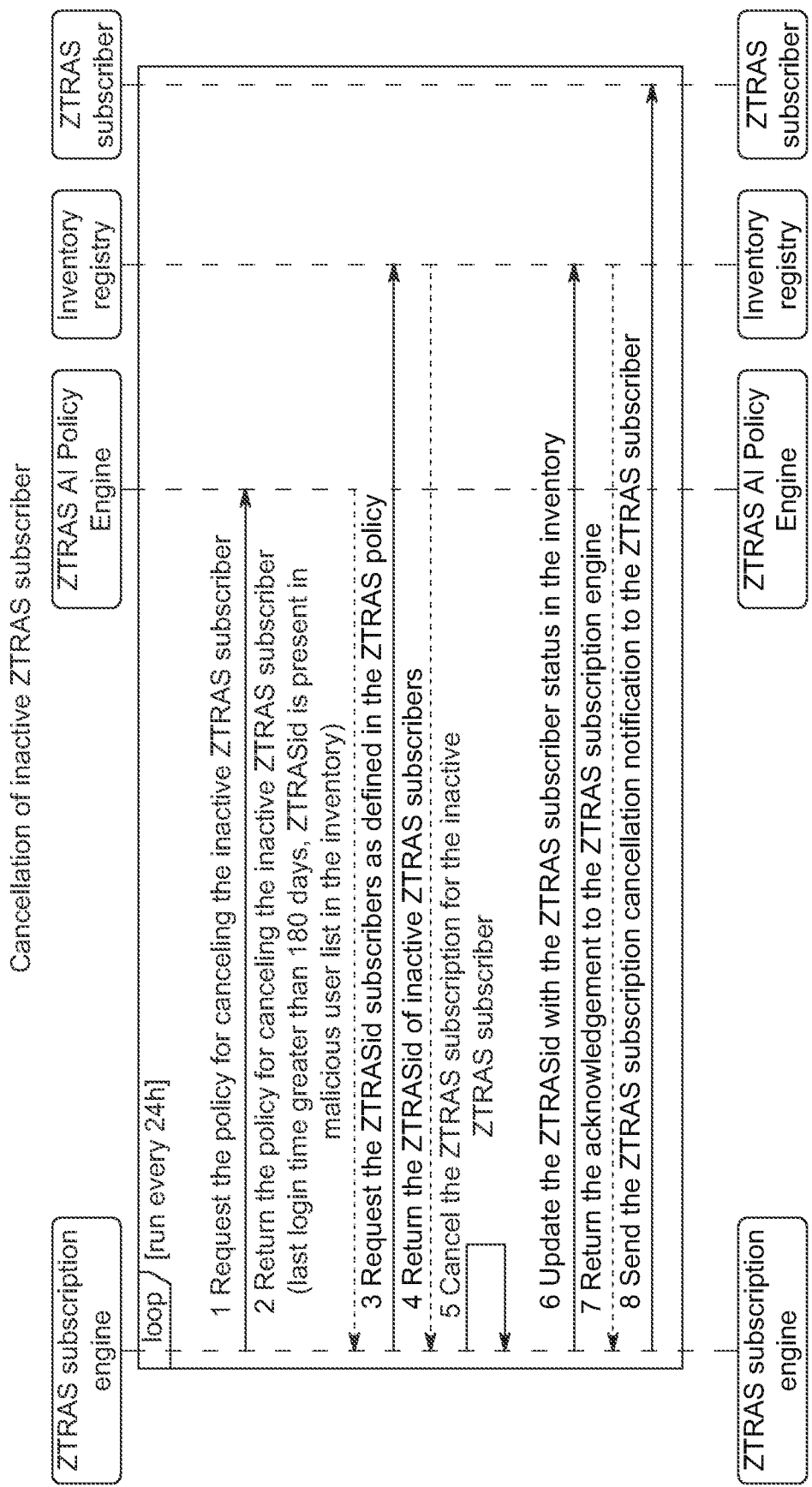
FIG. 8 illustrates a call flow for canceling an inactive ZTRAS subscriber according to an embodiment.

FIG. 8 illustrates a call flow for canceling an inactive ZTRAS subscriber according to an embodiment. In the example of FIG. 8, the ZTRAS subscription engine runs the check for cancelling the ZTRAS subscription of inactive subscribers based on a policy defined by the ZTRAS AI Policy Engine. By way of example, the check may occur in accordance with a predetermined schedule (e.g., once every 24 hours (daily)). It is understood that other example embodiments are not limited to this periodical check (e.g., the check may be event-based, user selected, based on a different predetermined periodicity, etc.).

Referring to FIG. 8, at (1), the ZTRAS subscription engine requests the policy for cancelling the inactive ZTRAS subscription from the policy engine.

At (2), the policy engine returns the policy for cancelling the inactive ZTRAS subscription to the ZTRAS subscription engine. By way of example, the policy may define an inactive user to be cancelled as one for which the last login time is greater than 180 days or if the $ZTRAS_{id}$ is present in a malicious user list in the inventory.

At (3), the ZTRAS subscription engine requests the $ZTRAS_{id}$ of one or more (e.g., all or a plurality of) inactive ZTRAS subscribers to be cancelled as defined in the ZTRAS policy from the inventory registry.

At (4), the inventory registry returns the $ZTRAS_{id}$ of inactive ZTRAS subscribers to the ZTRAS subscription engine.

At (5), the ZTRAS subscription engine cancels the ZTRAS subscription for the inactive ZTRAS subscriber.

At (6), the ZTRAS subscription engine updates the $ZTRAS_{id}$ with the ZTRAS subscriber status in the inventory.

At (7), the inventory registry returns the acknowledgement for updating the subscriber status to the ZTRAS subscription engine.

At (8), the ZTRAS subscription engine sends the ZTRAS subscription cancellation notification to the cancelled ZTRAS subscriber.

Figure 9:
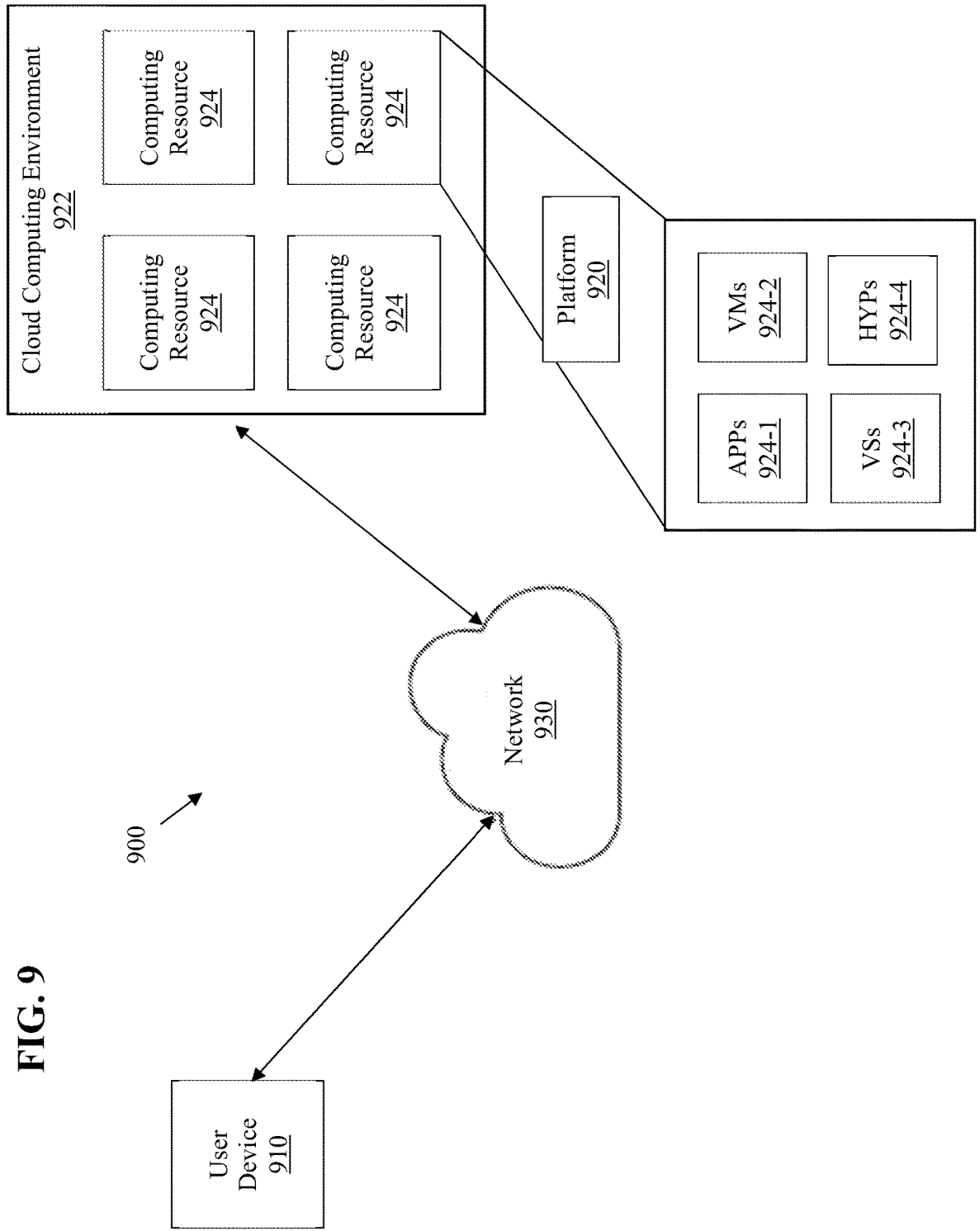
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIGS. 1 through 8 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/ receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
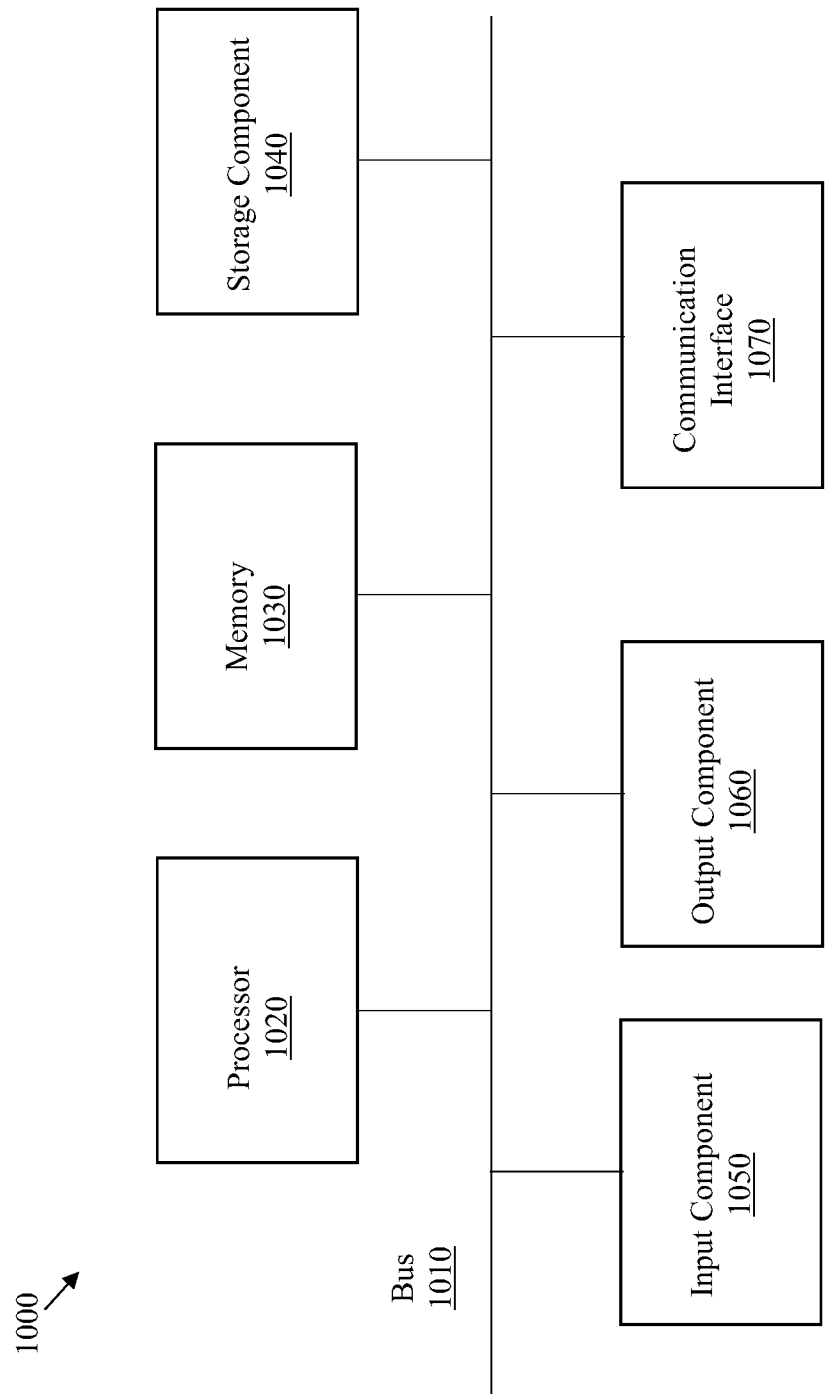
FIG. 10 is a diagram of example components of a device according to an embodiment.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 1 through 8, 11, and 12 may be implemented by or using any one of the elements illustrated in FIGS. 9 and 10.

Figure 11:
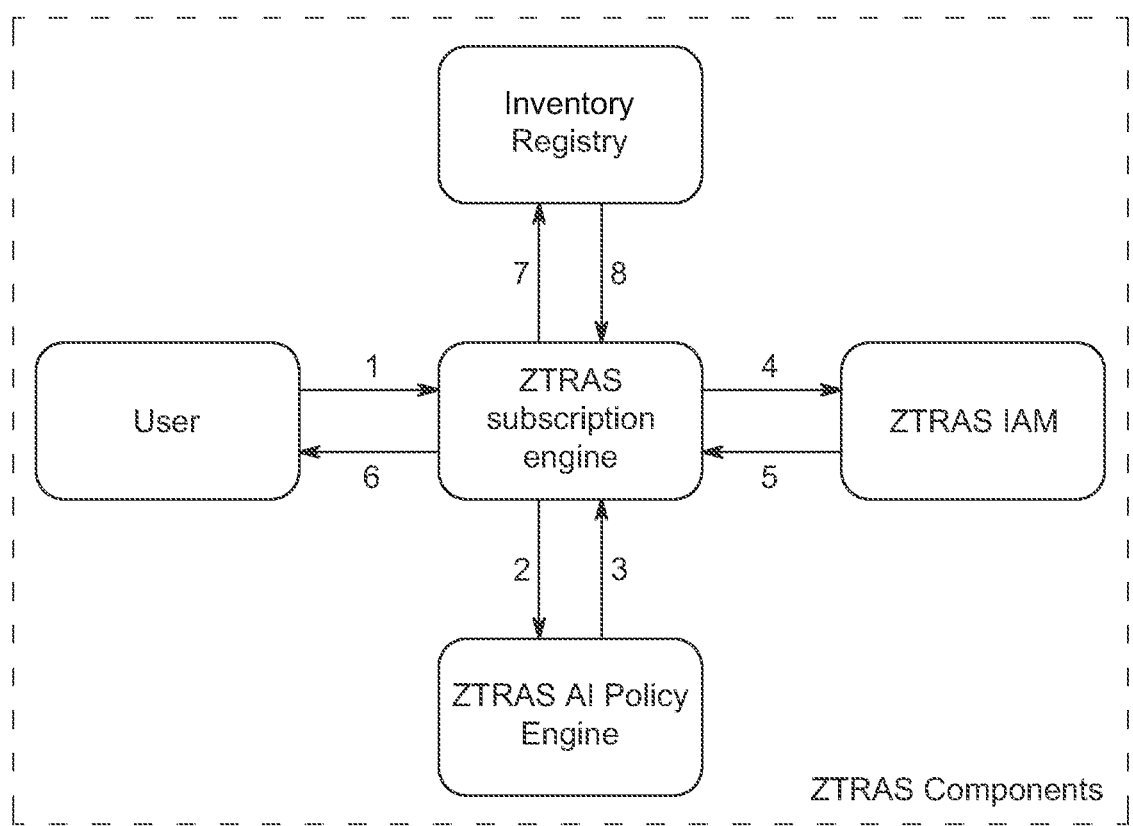
FIG. 11 illustrates a block diagram of a communication flow for subscribing a user in a ZTRAS according to an embodiment.

FIG. 11 illustrates a block diagram of a communication flow for subscribing a user in a ZTRAS according to an embodiment. Referring to FIG. 11, at (1), an incoming request is received by the ZTRAS subscription engine from a user. For example, the request may be a subscription request or may be a request to access a target node in the network system.

At (2), the ZTRAS subscription engine requests validation of trust percentage and $ZTRAS_{id}$ subscription from the ZTRAS AI policy engine. For example, the ZTRAS AI policy engine determine whether the user is trusted (valid and unexpired $ZTRAS_{id}$) or untrusted, and may calculate a trust percentage for the user based on request parameters, such as at least one of geolocation, IP address, IP version, IP subnet, FQDN, device credentials, etc. As described above, the ZTRAS AI Policy Engine may determine validity of each of the request parameters based on one or more predefined rules. In this regard, validity is determined based on criteria defined in a policy. For example, the policy may define a particular geolocation (e.g., Japan) as a valid geolocation. In this case, if the location of the user is outside of Japan, then the geolocation request parameter would be invalid.

At (3), the AI policy engine returns an acknowledgement of the validation of the trust percentage and the $ZTRAS_{id}$ subscription.

Further, at (4), where the user is an untrusted user or has an invalid (e.g., due to context change) or expired $ZTRAS_{id}$ subscription, a new $ZTRAS_{id}$ is generated and registered via the ZTRAS IAM. At (5), the ZTRAS IAM returns an acknowledgement with the generated $ZTRAS_{id}$ to the ZTRAS subscription engine. At (6), the ZTRAS subscription engine sends the newly generated ZTRAS subscription information and subscriber agent (e.g., client device) configuration details to the user (i.e., ZTRAS subscriber) for configuring of the client device.

At (7), the ZTRAS subscription engine updates the newly generated $ZTRAS_{id}$ in the inventory registry, and at (8) the inventory registry returns an acknowledgment for the update in the inventory.

Figure 12:
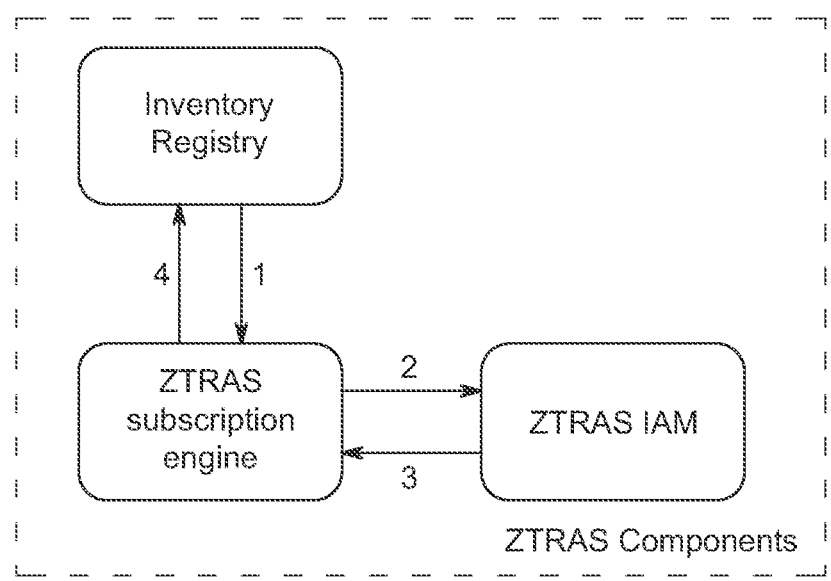
FIG. 12 illustrates a block diagram of a communication flow for generating a $ZTRAS_{id}$ according to an embodiment.

FIG. 12 illustrates a block diagram of a communication flow for generating a $ZTRAS_{id}$ according to an embodiment. Referring to FIG. 12, at (1), the ZTRAS subscription engine fetches input parameters for generating the $ZTRAS_{id}$ from the inventory registry, such as (but not limited to) at least one of user account (e_uid), location (loc), protocol type (proto), time zone (tz), type of user (u_type), PRG (pseudo-random generator), timestamp (ts), etc.

At (2), the ZTRAS subscription engine sends the input parameters to the ZTRAS IAM for generation of the $ZTRAS_{id}$. At (3), the ZTRAS IAM returns the generated $ZTRAS_{id}$ (e.g., a string of or based on e_uid,loc,proto,tz, u_typ,prg,ts) to the ZTRAS subscription engine. At (4), the ZTRAS subscription engine updates the newly generated $ZTRAS_{id}$ in the inventory registry.

The foregoing disclosure provides illustration and description but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for providing zero trust remote access to a node in a network system, the method comprising:
    receiving a request of a user to access a target node in the network system;
    determining whether the user is a trusted user or an untrusted user based on whether the user has a zero trust remote access system (ZTRAS) subscription identification (ID) registered and valid in the network system;
    based on determining that the user is the untrusted user, generating the ZTRAS subscription ID for the user;
    validating a trust of the user;
    determining a validity period for the ZTRAS subscription ID of the user based on the validated trust; and
    providing the user with access to the target node in accordance with the validity period,
    wherein the determining whether the user is the trusted user or the untrusted user comprises determining that the user is the untrusted user based on the received request not including the ZTRAS subscription ID registered in the network system, or based on the received request including a previously registered ZTRAS subscription ID that is no longer valid.

2. The method as claimed in claim 1, wherein the validating the trust of the user comprises:
    calculating a trust percentage for the user; and
    determining the validity period for the ZTRAS subscription ID of the user based on the calculated trust percentage.

3. The method as claimed in claim 2, wherein the trust percentage is calculated for the user irrespective of whether a user context or request context has changed for the user.

4. The method as claimed in claim 2, wherein the calculating the trust percentage comprises calculating the trust percentage based on at least one of:
    one or more parameters of the received request; and
    whether the user is an internal user or an external user.

5. The method as claimed in claim 1, further comprising authenticating the user in accordance with whether the user is an internal user or an external user.

6. The method as claimed in claim 1, wherein the target node is an application, a cloud-native network function (CNF), a virtualized network function (VNF), a cluster, or a physical host in the network system.

7. The method as claimed in claim 1, further comprising:
    providing one or more parameters or attributes of the request to an artificial intelligence (AI) policy engine; and validating, by the AI policy engine, the request based on the one or more parameters or attributes.

8. A system for providing zero trust remote access to a node in a network system, the system comprising:
at least one memory storing instructions; and
at least one processor configured to execute the instructions to:
receive a request of a user to access a target node in the network system,
determine whether the user is a trusted user or an untrusted user based on whether the user has a ZTRAS subscription identification (ID) registered and valid in the network system,
based on determining that the user is the untrusted user, generate the ZTRAS subscription ID for the user,
validate a trust of the user,
determine a validity period for the ZTRAS subscription ID of the user based on the validated trust, and
provide the user with access to the target node in accordance with the validity period,
wherein the at least one processor is configured to execute the instructions to determine that the user is the untrusted user based on the received request not including the ZTRAS subscription ID registered in the network system, or based on the received request including a previously registered ZTRAS subscription ID that is no longer valid.

9. The system as claimed in claim 8, wherein the at least one processor is configured to execute the instructions to validate the trust of the user by:
calculating a trust percentage for the user; and
determining the validity period for the ZTRAS subscription ID of the user based on the calculated trust percentage.

10. The system as claimed in claim 9, wherein the trust percentage is calculated for the user irrespective of whether a user context or request context has changed for the user.

11. The system as claimed in claim 9, wherein the at least one processor is configured to execute the instructions to calculate the trust percentage based on at least one of:
one or more parameters of the received request; and
whether the user is an internal user or an external user.

12. The system as claimed in claim 8, wherein the at least one processor is configured to execute the instructions to authenticate the user in accordance with whether the user is an internal user or an external user.

13. A non-transitory computer-readable recording medium having recorded thereon instructions executable by at least one processor to perform a method for providing zero trust remote access to a node in a network system, the method comprising:
receiving a request of a user to access a target node in the network system;
determining whether the user is a trusted user or an untrusted user based on whether the user has a ZTRAS subscription identification (ID) registered and valid in the network system;
based on determining that the user is the untrusted user, generating the ZTRAS subscription ID for the user;
validating a trust of the user;
determining a validity period for the ZTRAS subscription ID of the user based on the validated trust; and
providing the user with access to the target node in accordance with the validity period,
wherein the determining whether the user is the trusted user or the untrusted user comprises determining that the user is the untrusted user based on the received request not including the ZTRAS subscription ID registered in the network system, or based on the received request including a previously registered ZTRAS subscription ID that is no longer valid.

14. The non-transitory computer-readable recording medium as claimed in claim 13, wherein the validating the trust of the user comprises:
calculating a trust percentage for the user; and
determining the validity period for the ZTRAS subscription ID of the user based on the calculated trust percentage.

15. The non-transitory computer-readable recording medium as claimed in claim 14, wherein the trust percentage is calculated for the user irrespective of whether a user context or request context has changed for the user.

16. The non-transitory computer-readable recording medium as claimed in claim 14, wherein the calculating the trust percentage comprises calculating the trust percentage based on at least one of:
one or more parameters of the received request; and
whether the user is an internal user or an external user.

17. The non-transitory computer-readable recording medium as claimed in claim 13, wherein the method further comprises authenticating the user in accordance with whether the user is an internal user or an external user.

* * * * *